(12) United States Patent
Wun et al.

(10) Patent No.: US 10,795,407 B2
(45) Date of Patent: Oct. 6, 2020

(54) ELECTRONIC READING DEVICE WITH A MID-FRAME STRUCTURE

(71) Applicant: RAKUTEN KOBO INC., Toronto (CA)

(72) Inventors: Archer Wun, Maple (CA); Kuan-Chang Lin, New Taipei (TW); Anna Buechin, Toronto (CA); Chris Leung, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 0 days.

(21) Appl. No.: 16/165,678

(22) Filed: Oct. 19, 2018

(65) Prior Publication Data

US 2020/0125141 A1 Apr. 23, 2020

(51) Int. Cl.
*G06F 1/16* (2006.01)
*G06F 3/0482* (2013.01)
*G06F 15/02* (2006.01)
*G06F 3/0483* (2013.01)

(52) U.S. Cl.
CPC .......... *G06F 1/1626* (2013.01); *G06F 3/0482* (2013.01); *G06F 3/0483* (2013.01); *G06F 15/0291* (2013.01); *G06F 2200/1614* (2013.01)

(58) Field of Classification Search
CPC ........ G06Q 20/04; G06Q 20/16; G06Q 20/28; G06Q 20/367; G06F 15/02
USPC ....................................................... D14/383
See application file for complete search history.

(56) References Cited

U.S. PATENT DOCUMENTS

| D308,364 | S | * | 6/1990 | Beasley, Jr. | D14/389 |
| D582,878 | S | * | 12/2008 | Kimura | D14/138 AD |
| D662,002 | S | * | 6/2012 | Lee | D10/108 |
| D663,638 | S | * | 7/2012 | Lee | D10/108 |
| D676,044 | S | * | 2/2013 | Nakagawa | D14/341 |
| D692,420 | S | * | 10/2013 | McManigal | D14/341 |
| D716,301 | S | * | 10/2014 | Almond | D14/389 |
| D718,308 | S | * | 11/2014 | Nishizawa | D14/389 |
| D741,298 | S | * | 10/2015 | Lintz | D14/217 |

(Continued)

FOREIGN PATENT DOCUMENTS

WO 2004/059422 A2 7/2004

OTHER PUBLICATIONS

International Search Report and Written Opinion issued in International Application PCT/JP2019/041229 dated Dec. 24, 2019.

(Continued)

*Primary Examiner* — Olga V Merkoulova
(74) *Attorney, Agent, or Firm* — Xsensus LLP

(57) ABSTRACT

An electronic reading device, including: a housing, wherein exterior surfaces of the housing include a first and second main surface, a first edge, a second edge, a third edge, and a fourth edge, and each of the edges is located in between the first and second main surface, and the third edge is parallel to the fourth edge, and the first edge is located at an opposite side of the housing than the second edge. The first main surface includes a display, and the second main surface is an opposing surface to the first main surface. The housing is asymmetrical as it includes an extended housing portion that is spaced away from one edge of the display, a thickness of the housing between the first and second main surface increases from the second edge to the first edge, and the housing has an upward bend at the extended housing portion.

17 Claims, 19 Drawing Sheets

(56) References Cited

U.S. PATENT DOCUMENTS

| | | | |
|---|---|---|---|
| D755,785 S * | 5/2016 | Sirotich | D14/341 |
| D779,483 S * | 2/2017 | Wall | D14/341 |
| 9,641,920 B1 * | 5/2017 | Jones, II | H04R 1/02 |
| D789,362 S * | 6/2017 | Eljas | D14/366 |
| D832,838 S * | 11/2018 | Monroe | D14/358 |
| D851,169 S * | 6/2019 | Yaginuma | D18/4.6 |
| D859,516 S * | 9/2019 | Wang | D18/4.6 |
| D864,200 S * | 10/2019 | Holman, IV | D14/384 |
| D864,201 S * | 10/2019 | Nishizawa | D14/389 |
| 2013/0194731 A1 | 8/2013 | Nakano | |
| 2013/0301202 A1 * | 11/2013 | Fowler | H05K 3/32 |
| | | | 361/679.21 |
| 2017/0061918 A1 * | 3/2017 | Lim | G02F 1/1345 |
| 2017/0126865 A1 * | 5/2017 | Lee | H04M 1/0266 |
| 2017/0139505 A1 * | 5/2017 | Shepelev | G06F 3/0416 |
| 2018/0263133 A1 * | 9/2018 | Lu | H05K 5/0017 |
| 2019/0244007 A1 * | 8/2019 | Bach | G06K 9/00087 |
| 2020/0125141 A1 * | 4/2020 | Wun | G06F 1/1626 |
| 2020/0125226 A1 * | 4/2020 | Wun | G09G 5/34 |
| 2020/0125528 A1 * | 4/2020 | Hutton | G06F 3/0483 |

OTHER PUBLICATIONS

Rakuten Kobo Inc., "'Rakuten Kobo' is Now Accepting Order of 'Kobo Forma', an 8-inch Screen New eReader", Press Release, 5 Pages total, (Oct. 3, 2018).

Octoba Inc., "Rotation Control: You Can Force the Horizontal Screen Game to be Vertical! Apps that Control Android Screen Rotation", 5 Pages total, (Jun. 9, 2015).

"Rotation Lock Adaptive (Free): Vertical/Horizontal Display Switching App that Does Not Switch Automatically", 2 Pages total, (Feb. 23, 2015).

* cited by examiner

ELECTRONIC READING DEVICE WITH A MID-FRAME STRUCTURE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

An electronic reader, also known as an e-reader device, is an electronic personal display that is used for reading electronic books (eBooks), electronic magazines, and other digital content. For example, digital content of an e-book is displayed as alphanumeric characters and/or graphic images on a display of an e-reader such that a user may read the digital content much in the same way as reading the analog content of a printed page in a paper-based book. An e-reader device provides a convenient format to store, transport, and view a large collection of digital content that would otherwise potentially take up a large volume of space in traditional paper format.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

An exemplary embodiment of the present disclosure provides an electronic reading device. The electronic reading device including: a housing, wherein exterior surfaces of the housing comprise a first main surface, a second main surface, a first edge, a second edge, a third edge, and a fourth edge, and each of the first edge, the second edge, the third edge, and the fourth edge is located in between the first main surface and the second main surface, and the third edge is parallel to the fourth edge, and the first edge is located at an opposite side of the housing than the second edge. The electronic reading device includes a display that is surrounded by the housing, wherein the first main surface of the electronic reading device includes the display, and the second main surface of the electronic reading device is an opposing surface to the first main surface. The housing is asymmetrical as it includes an extended housing portion that is spaced away from one edge of the display by a predetermined distance, a thickness of the housing between the first main surface and the second main surface increases from the second edge to the first edge, and the housing has an upward bend at the extended housing portion so that the first main surface in the extended housing portion is located above an exterior surface of the display, the upward bend allowing the electronic reading device to be easily picked up.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
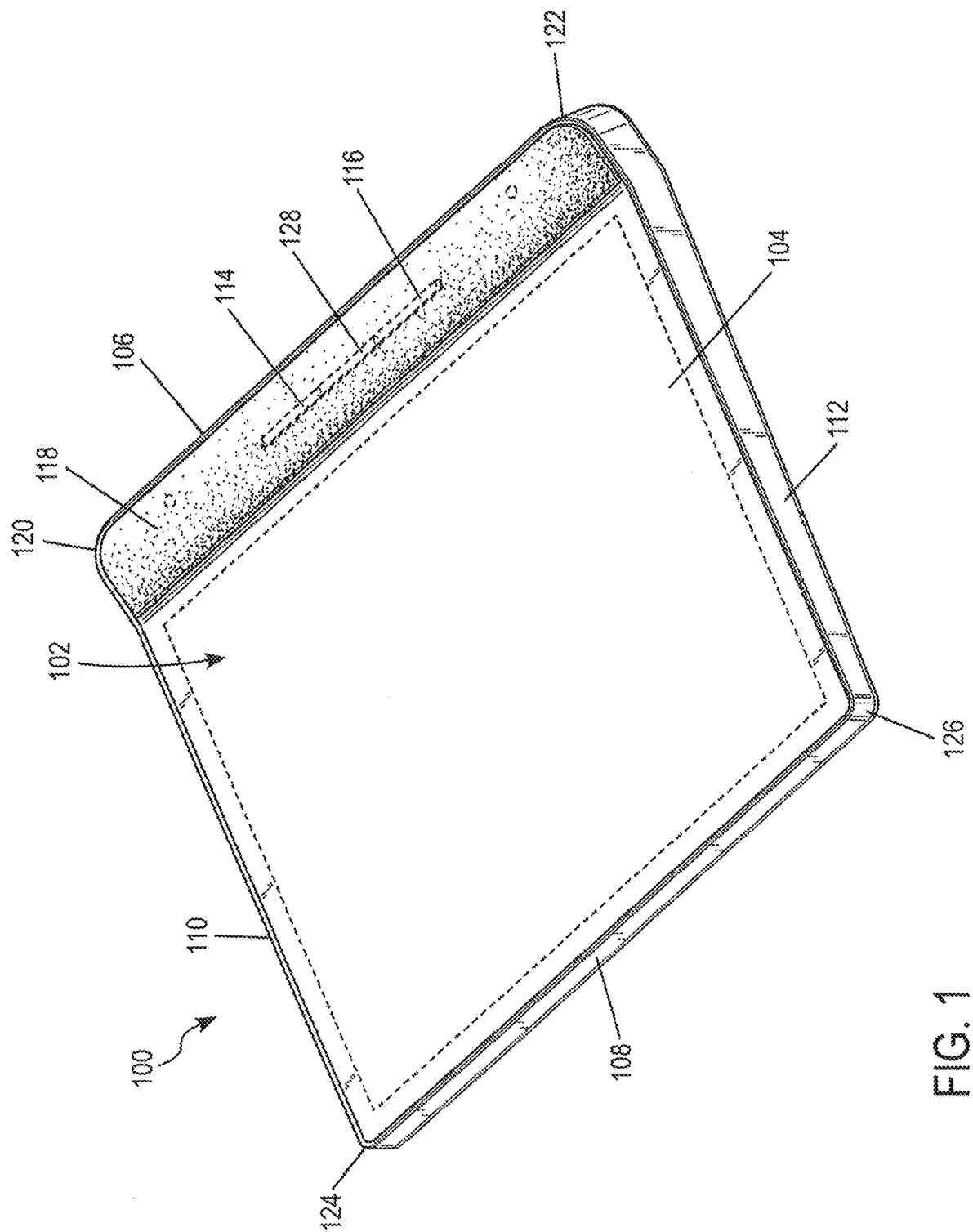
FIG. 1 depicts a perspective view of an electronic reading device according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Also, no claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Referring now to the drawings, wherein like reference numerals designate identical or corresponding parts throughout the several views.

Figure 8:
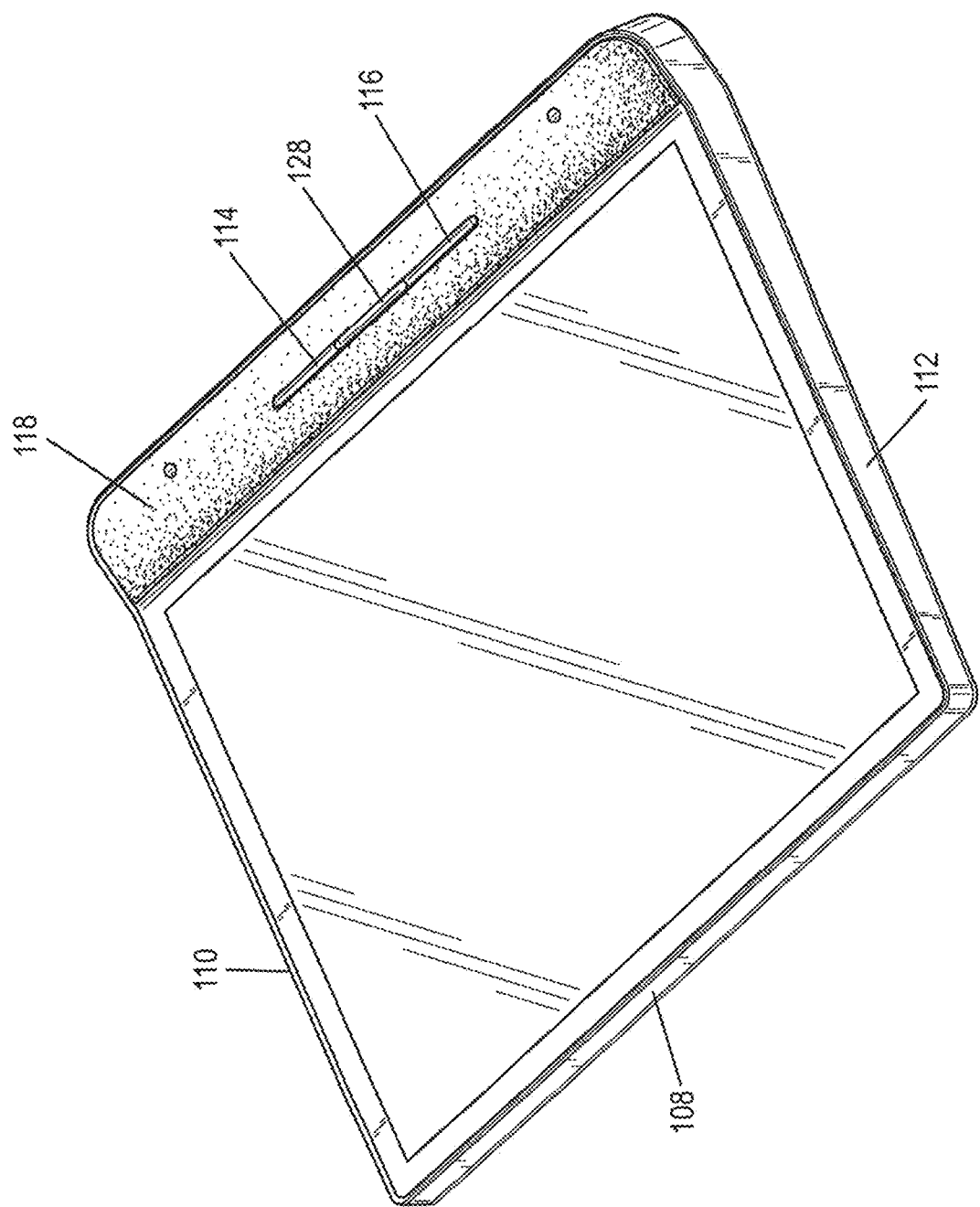
FIG. 8 depicts a perspective view of an electronic reading device according to one or more aspects of the disclosed subject matter.

FIG. 1 depicts a perspective view of a front of an electronic reading device 100 according to one or more aspects of the disclosed subject matter. FIG. 8 is a similar view as FIG. 1. The electronic reading device 100 (also referred to as e-reader 100, e-reader device 100, electronic reader 100, the device 100, etc.), is an electronic personal display that is used for reading electronic books (eBooks), electronic magazines, and other digital content. For example, digital content of an eBook is displayed as alphanumeric characters and/or graphic images on a display of an e-reader such that a user may read the digital content much in the same way as reading the analog content of a printed page in a paper-based book. An e-reader provides a convenient format to store, transport, and view a large collection of digital content that would otherwise potentially take up a large volume of space in traditional paper format.

In some instances, e-readers are purpose built devices designed to perform especially well at displaying readable content. For example, a purpose built e-reader may include a display that reduces glare, performs well in high light conditions, and/or mimics the look of text on actual paper. While such purpose built e-readers may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

The electronic reading device 100 can enhance electronic reading activity, according to an embodiment. The electronic reading device 100 can include an electronic display device and a network service. The network service may include multiple servers and other computing resources that provide various services in connection with one or more applications that are installed on the e-reader device. By way of example, in one implementation, the network service can provide e-book services which communicate with the e-reader device. The e-book services provided through network service can, for example, include services in which e-books are sold, shared, downloaded and/or stored. More generally, the network service can provide various other content services, including content rendering services (e.g., streaming media) or other network-application environments or services.

The e-reader device 100 can correspond to any electronic personal display device on which applications and application resources (e.g., e-books, media files, documents) can be rendered and consumed. For example, the e-reader device 100 can correspond to a tablet or a telephony/messaging device (e.g., smart phone). In one implementation, for example, e-reader device 100 can run an e-reader application that links the device to the network service and enables e-books provided through the service to be viewed and consumed. In another implementation, the e-reader device 100 can run a media playback or streaming application which receives files or streaming data from the network service. By way of example, the e-reader device 100 can be equipped with hardware and software to optimize certain application activities, such as rendering of electronic content (e.g., e-books). For example, the e-reader device 100 can have a tablet like form factor, although variations are possible. In some cases, the e-reader device 100 can also have an E-ink display.

The e-reader device 100 includes a housing that includes a display screen 104 on which text content from selected e-books can be rendered. The display screen 104 can be configured as a touch sensitive component of a display unit assembly on which input features are provided or are otherwise enabled. In an exemplary embodiment, the display screen 104 is an 8-inch flexible display, such as a plastic-backed display. As seen in FIG. 1, the housing has an asymmetrical design in which the housing extends a greater distance from the display screen 104 on one side due to the presence of an extended housing portion 118. In FIG. 1, the extended housing portion 118 is located to the right of the display screen 104. The housing has a first main surface 102 (i.e., a front surface) and a second main surface 302 (i.e., a back surface, shown in FIG. 3). The housing also has a first edge 106 (i.e., the right edge shown in FIG. 1), a second edge 108 (i.e., the left edge shown in FIG. 1), a third edge 110 (i.e., the upper edge shown in FIG. 1), and a fourth edge 112 (i.e., the lower edge shown in FIG. 1).

As seen in FIG. 1, the thickness of the housing gradually increases from the second edge 108 to the first edge 106. In an exemplary embodiment, the thickness of the housing in the extended housing portion 118 is uniform, and the thickness can be, for example, 8 to 11 mm. In an exemplary embodiment, the thickness of the housing in the extended housing portion 118 is 9.8 mm. The greater thickness of the housing in the extended housing portion 118 simulates the feel of a soft-cover book with the pages folded back. In an exemplary embodiment, the thickness of the housing in the extended housing portion 118 is not uniform, but only varies at most 10 percent. The thinnest portion of the housing, located closest to the second edge 108, can be, for example, between 4 to 6 mm. In an exemplary embodiment, the thinnest portion of the housing can be 5 mm+/−0.5 mm (e.g., 5 mm). In an exemplary embodiment, the distance between the third edge 110 and the fourth edge 112 can be 173 mm+/−10 mm (e.g., 173.1 mm). In an exemplary embodiment, the distance between the first edge 106 and the second edge 108 can be 156 mm+/−10 mm (e.g., 156.4 mm). The e-reading device 100 can have a range of dimensions to incorporate the various hardware components. In an exemplary embodiment, the depth of the e-reading device 100 can be less than seven millimeters. More specifically, the depth of the electronic reading device can be 6.99 millimeters.

Figure 7:
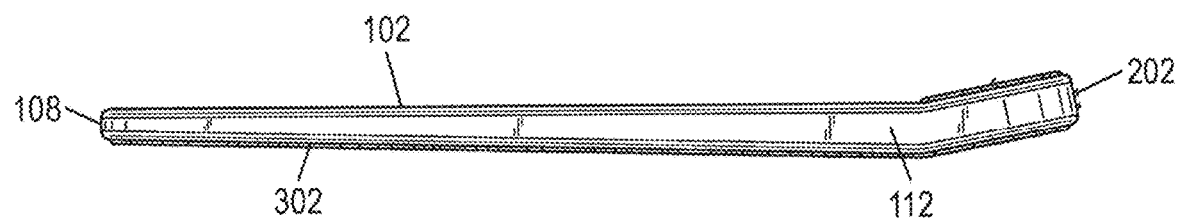
FIG. 7 depicts a perspective view of a side of an electronic reading device according to one or more aspects of the disclosed subject matter.

As seen in FIG. 7, when the e-reader device 100 is placed on a flat surface, with the second main surface 302 in contact with the flat surface, the e-reader device 100 can be easily picked up due to the upward angle of the housing in the area of the extended housing portion 118. The upward angled hand grip in the extended housing portion 118 is designed to fit into the natural pocket formed by a palm of a user when their hand is in a natural and relaxed posture, which is a major ergonomic benefit of the angled hand grip design. In addition, the angled soft touch coated hand grip of the extended housing portion 118 and a spacer 128 provide a natural thumb rest area which works in conjunction with the curved and textured back cover 1502 that allow the user to secure the electronic reading device 100 in their hands without adding stress to their thumb and fingers even for long hours of usage. Another ergonomics benefit is that since the electronic reading device 100 has an upward angled hand grip feature, it will be easily picked up when the electronic reading device 100 is placed on a flat surface. Also, the extended housing portion 118 can have rubber or another high-friction finishes/material on the first main surface 102 side that provides for a good grip on the e-reader device 100.

Figure 11:
FIG. 11 depicts a perspective view of a side of an electronic reading device according to one or more aspects of the disclosed subject matter.

The extended housing portion 118 includes a first button 114 and a second button 116. As seen in FIG. 11, the first button 114 and the second button 116 are raised and extend past the rest of the surface of the extended housing portion 118. The first button 114 and the second button 116 are separated from each other a certain distance by the spacer 128 (e.g., a piece of rectangularly shaped plastic), and the distance can be the same as the length of the first button 114 or the second button 116. In an exemplary embodiment, the first button 114 and a second button 116 can be used to move the e-book one page forward or one page backward, and will be described in greater detail later. The flush surface in between the first button 114 and second button 116 (the spacer 128) provides a natural thumb rest area when holding the electronic reading device 100 while the page turn keys are not in operation. As seen in FIG. 8, the first button 114 and the second button 116 have a long rectangular shape that is oriented along the vertical direction (i.e., the buttons are parallel to the first edge 106). The first and second buttons 114, 116 extend for a relatively long distance along the extended housing portion 118. The position, shape, and length of the first and second buttons 114, 116 provide for a wide range of hand positions, and allows the user to avoid fatigue.

As seen in FIG. 1, the housing has four corners 120, 122, 124, and 126 that are rounded, and the radius of corners 120 and 122 (that are located in the extended housing portion 118) is larger than the radius of corners 124 and 126 (located on the opposite side of the housing than the extended housing portion 118).

Figure 2:
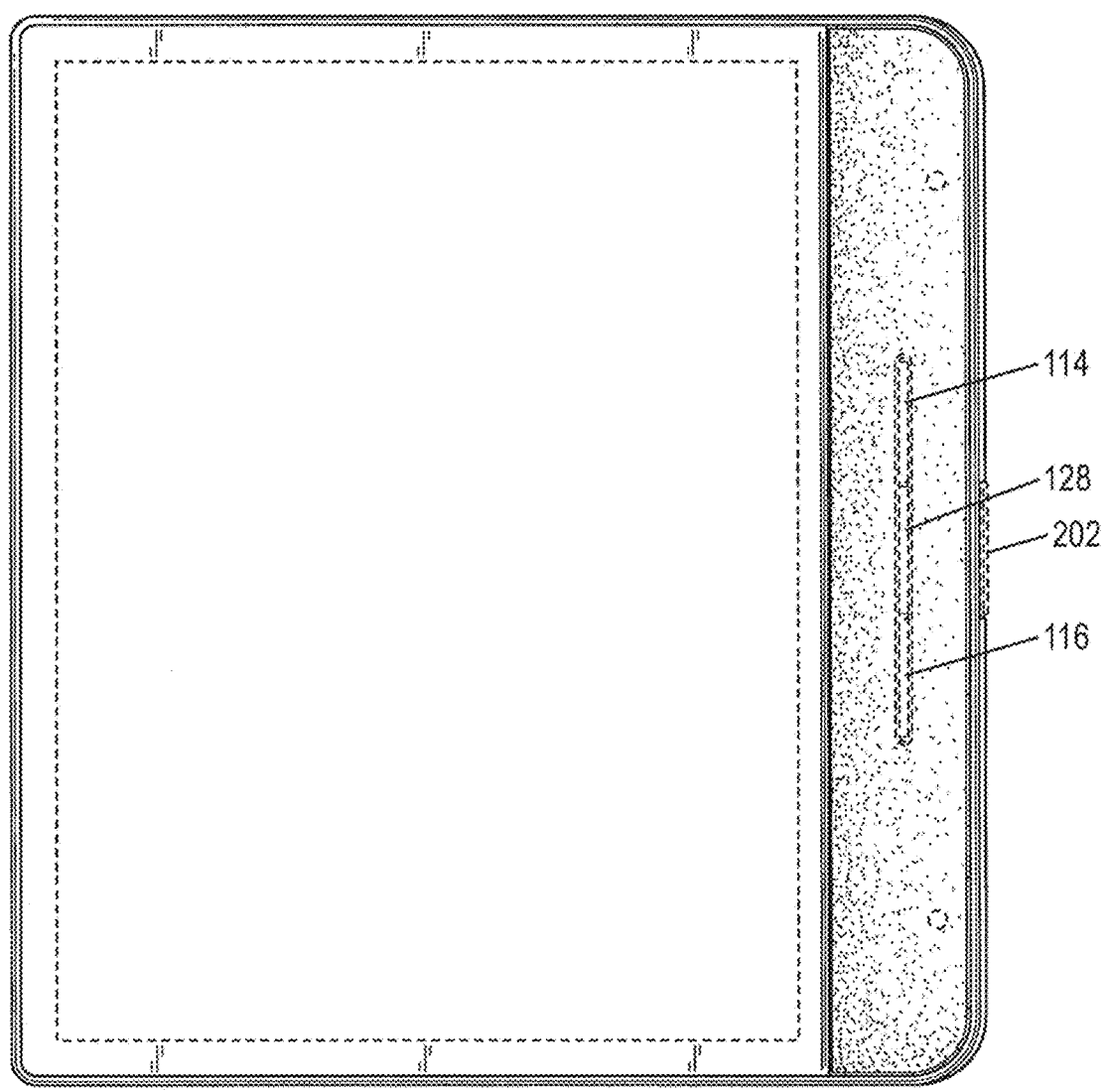
FIG. 2 depicts a perspective view of a front of an electronic reading device according to one or more aspects of the disclosed subject matter.
Figure 9:
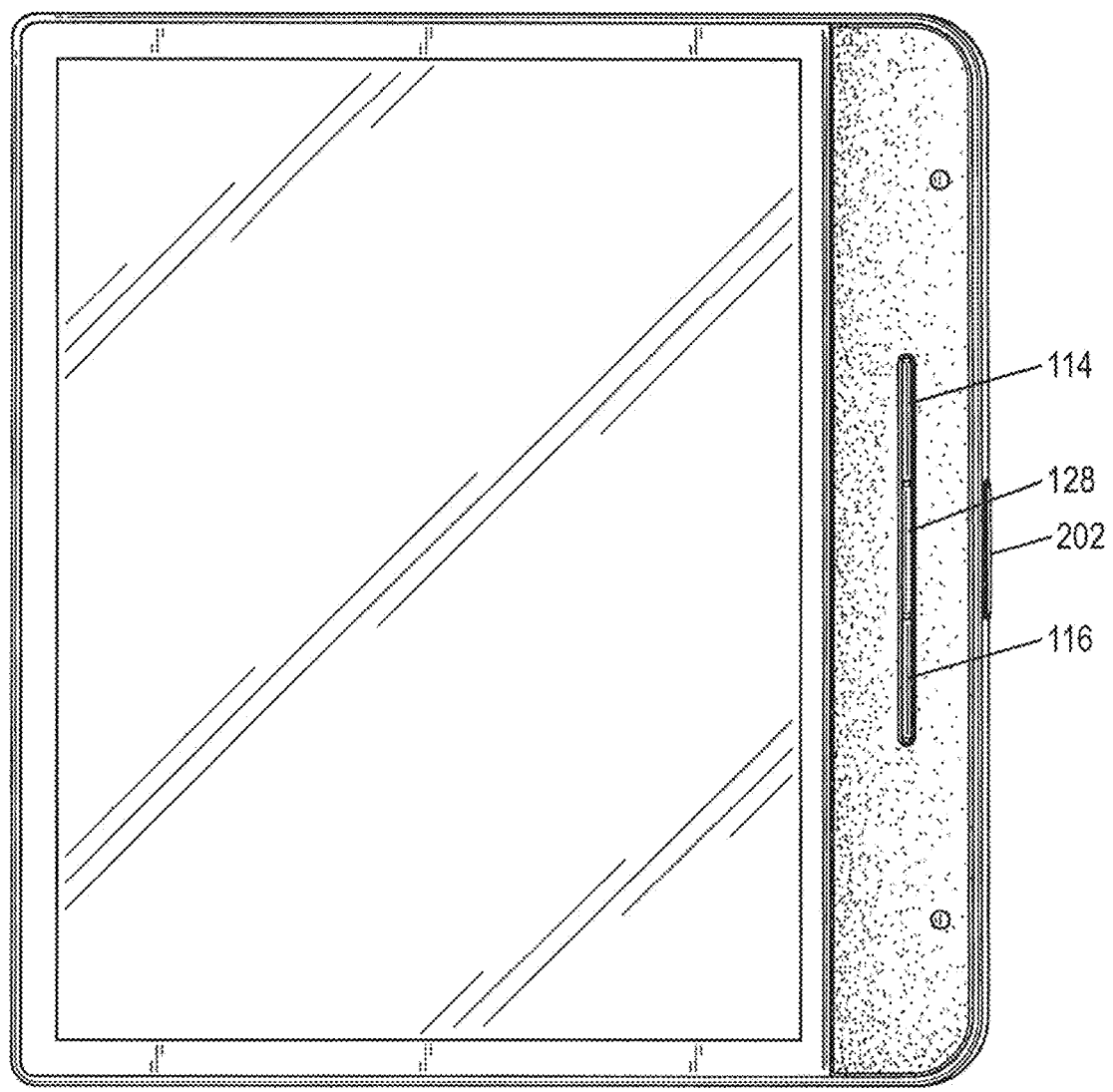
FIG. 9 depicts a perspective view of a front of an electronic reading device according to one or more aspects of the disclosed subject matter.

As seen in FIGS. 2 and 9, an on/off button 202 is located on the first edge 106. In an exemplary embodiment, the on/off button 202 is located in the middle of the first edge 106, but the on/off button 202 can be located anywhere along the first edge 106. The on/off button 202 can have an oval shape, a rectangular shape, or any other shape. The on/off button 202 can be raised and extend beyond the surface of the first edge 106.

Figure 3:
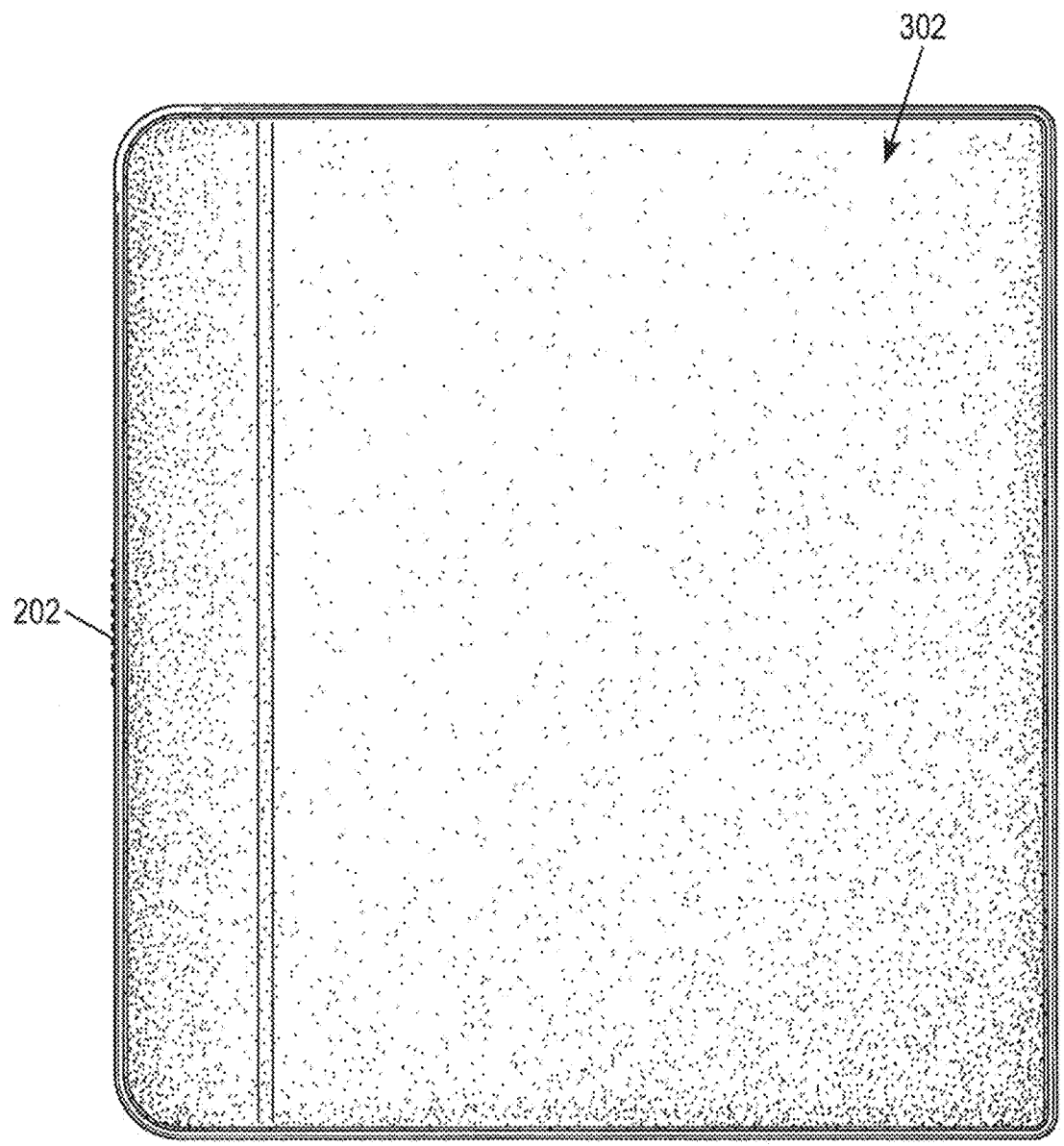
FIG. 3 depicts a perspective view of a back of an electronic reading device according to one or more aspects of the disclosed subject matter.
Figure 10:
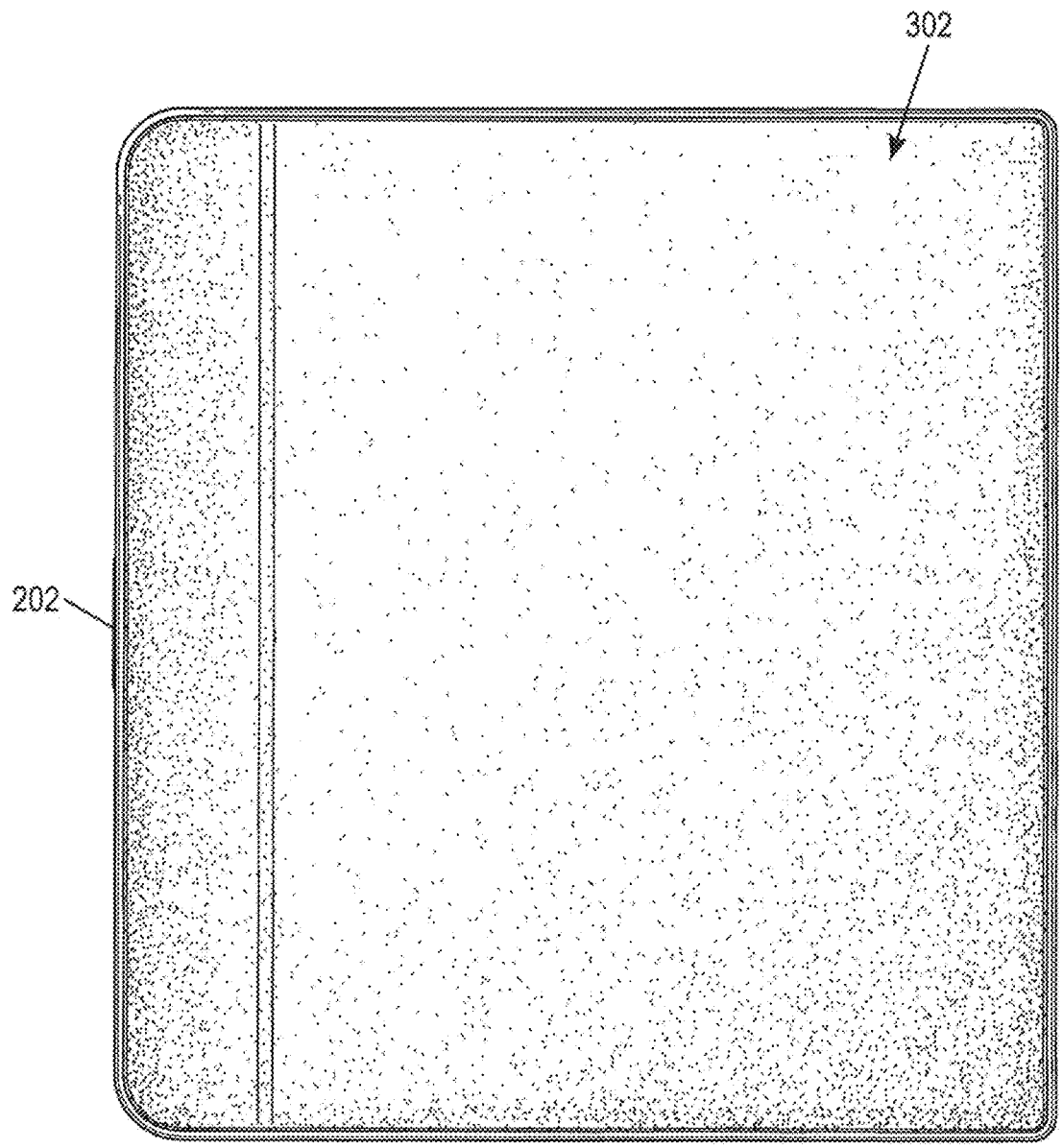
FIG. 10 depicts a perspective view of a back of an electronic reading device according to one or more aspects of the disclosed subject matter.

FIGS. 3 and 10 show the second main surface 302 (i.e., back cover/back surface) of the e-reader device 100. The second main surface 302 can be made of plastic, and all or some of the plastic can be covered with rubber to prevent sliding of the e-reader device 100.

Figure 4:
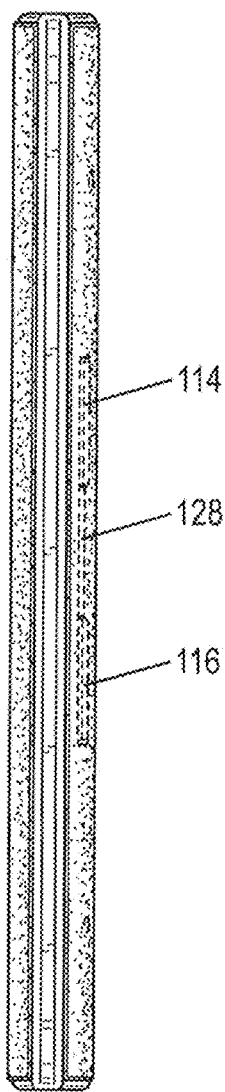
FIG. 4 depicts a perspective view of a side of an electronic reading device according to one or more aspects of the disclosed subject matter.

FIGS. 4 and 11 show a side view of the e-reader device 100, looking from the end of the device with the second edge 108. As seen in FIG. 11, the first button 114 and the second button 116 do not extend past the highest portion of the extended housing portion 118. In other words, as shown in FIGS. 7 and 14, the upper-most surface of the first edge 106 is higher than the upper-most surface of the first button 114 and the upper-most surface of the second button 116.

Figure 5:
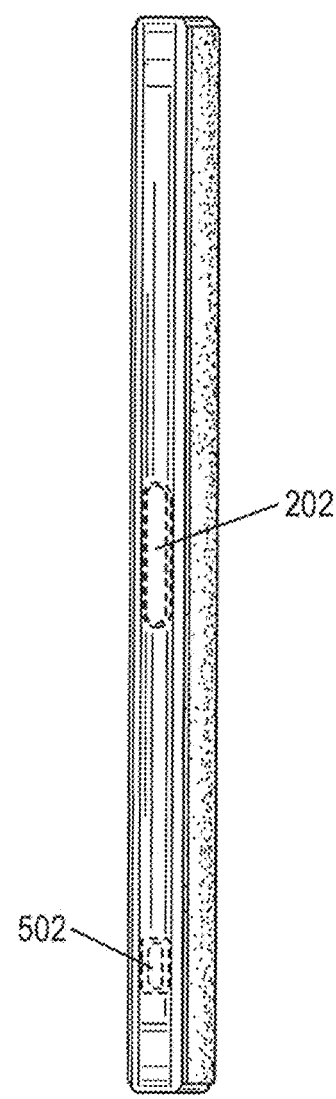
FIG. 5 depicts a perspective view of a side of an electronic reading device according to one or more aspects of the disclosed subject matter.
Figure 12:
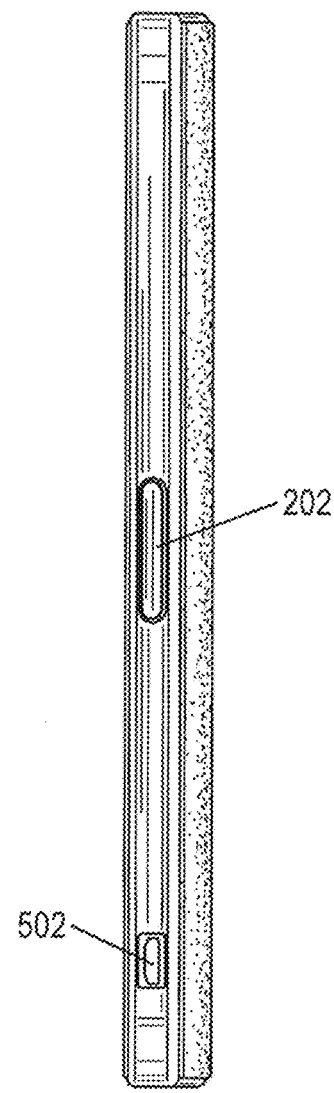
FIG. 12 depicts a perspective view of a side of an electronic reading device according to one or more aspects of the disclosed subject matter.

FIGS. 5 and 12 show a side view of the e-reader device 100, looking from the end of the device with the first edge 106. In an exemplary embodiment, the first edge 106 includes a charging port 502 that can be a USB port, a micro USB port, a firewire port, or any other port that can be used for charging.

Figure 6:
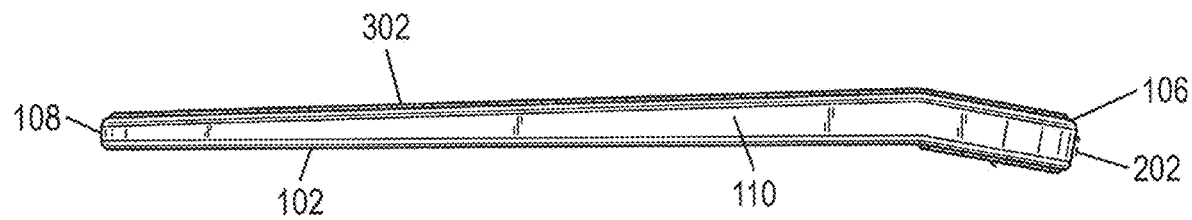
FIG. 6 depicts a perspective view of a side of an electronic reading device according to one or more aspects of the disclosed subject matter.
Figure 13:
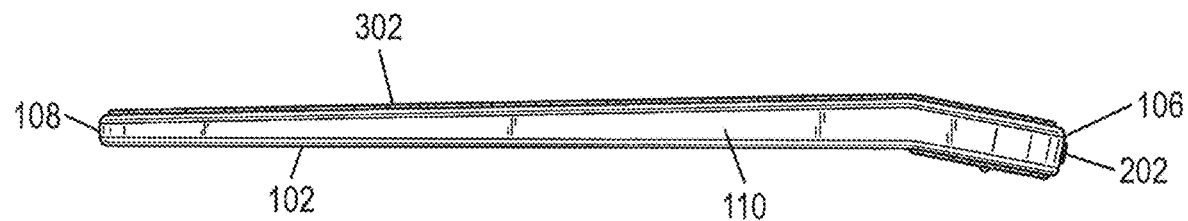
FIG. 13 depicts a perspective view of a side of an electronic reading device according to one or more aspects of the disclosed subject matter.

FIGS. 6 and 13 show a side view of the e-reader device 100, looking from the end of the device with the third edge 110. As seen in FIG. 6, the thickness of the e-reader device increases linearly from the left to the right (i.e., from the second edge to the left side of the extended housing portion 118). In FIGS. 6 and 13, the first main surface 102 with the display is on the lower side of the drawing, and the second main surface 302 is on the upper side of the drawing.

Figure 14:
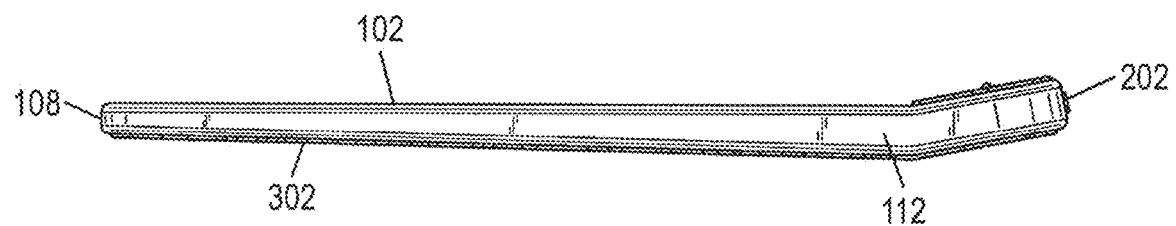
FIG. 14 depicts a perspective view of a side of an electronic reading device according to one or more aspects of the disclosed subject matter.

FIGS. 7 and 14 show a side view of the e-reader device 100, looking from the end of the device with the fourth edge 112. In FIGS. 7 and 14, the first main surface 102 with the display is on the upper side of the drawing, and the second main surface 302 is on the lower side of the drawing.

Figure 15:
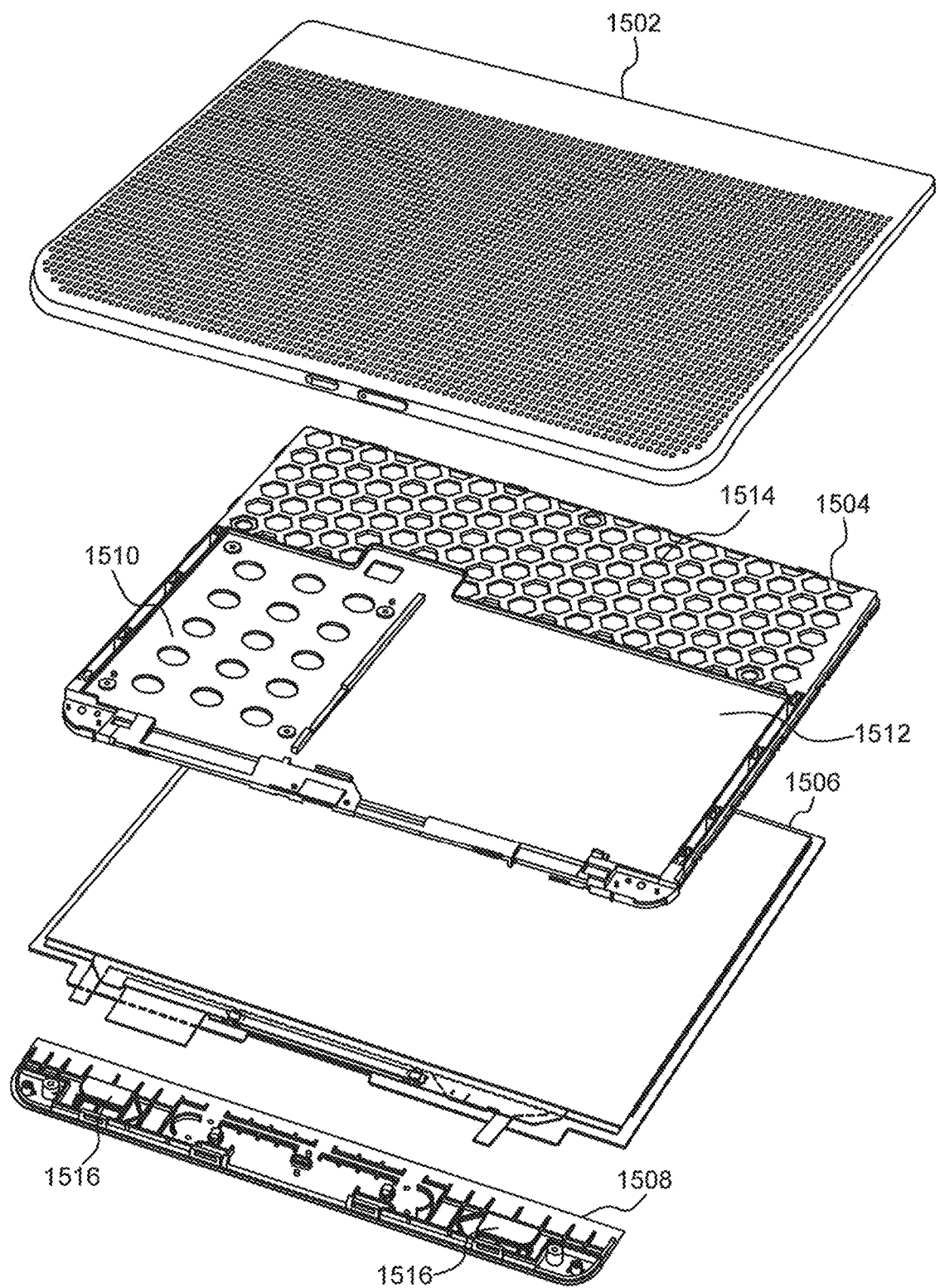
FIG. 15 is an exploded view of an electronic reading device according to one or more aspects of the disclosed subject matter.

FIG. 15 is an exploded view (mechanical stack up) of the e-reader device 100 in accordance with an exemplary embodiment. The components of the e-reader device 100 include a back cover 1502, a mid-frame component 1504, a display unit 1506, and a deco plate 1508. The back cover 1502 makes up at least the second main surface 302. The back cover 1502 can be made of, for example, plastic and have in-molded micro-texture with a soft touch coating on the exterior surface thereof. The back cover 1502 can also be a two shot molding that includes shock absorption material. The back cover 1502 of the e-reader device 100 can include predetermined patterns for various stylistic and aesthetic purposes, as well as for providing grip to assist in holding the e-reader device 100. The patterns may be laser cut, for example, such that at least a portion of the pattern includes a predetermined depth.

The mid-frame component 1504 functions as a stiffener, and adds rigidity and strength to the e-reader device 100. As seen in FIG. 15, the mid-frame component 1504 is located in between the back cover 1502 and the display unit 1506. The mid-frame component 1504 can be made of, for example, magnesium. The mid-frame component 1504 is not limited to magnesium and can be any other metal (e.g., aluminum, titanium, etc.). In an exemplary embodiment, the mid-frame component 1504 can be die-cast and co-molded. As seen in FIGS. 15-18, the mid-frame component 1504 includes a first recessed portion 1512 that is configured to accept a battery 1804, a second recessed portion 1510 that is configured to accept a printed circuit board (PCB) 1802. The mid-frame component 1504 also includes a weight reduction portion 1514. In an exemplary embodiment, the first recessed portion 1512 is rectangular in shape, and the battery 1804 can be held flush in the first recessed portion 1512. However, the first recessed portion 1512 can be any shape to correspond to the shape of a battery. In an exemplary embodiment, the first recessed portion 1512 is made of continuous material such that there are no holes or perforated sections. Alternatively, the first recessed portion 1512 may contain holes or perforated sections 2010 to reduce weight. The mid-frame component 1504 can increase rigidity of the electronic reading device 100. Specifically, a predetermined level of rigidity is advantageous due to the thinness of the electronic reading device 100 (e.g., 6.99 millimeters).

In an exemplary embodiment, the second recessed portion 1510 is rectangular in shape and includes holes or perforated sections 2010 to reduce weight. However, the second recessed portion 1510 can be any shape to correspond to the shape of the PCB 1802. The holes 2010 can be in the shape of a circle, square, triangle, hexagon, pentagon, or any other shape. The PCB 1802 can be held flush in the second recessed portion 1510. As seen in FIG. 15, the weight reduction portion 1514 covers most of the area of the mid-frame component 1504 that does not include the first recessed portion 1512 and the second recessed portion 1510. The weight reduction portion 1514 can include a ribbed or lattice-type structure that increases the rigidity of the mid-frame component 1504 where it is thinnest. FIG. 15 shows a honeycomb rib structure that increases rigidity but also reduces weight due to perforated holes 2010 being present in between the vertical rib pattern. The rib structure is not limited to a honeycomb structure, but instead can be made up of any shapes (triangles, pentagons, etc.). On the opposite side of the mid-frame component 1504 that includes the first recessed portion 1512 and the second recessed portion 1510, the mid-frame component 1504 can accept a plastic-backed display screen instead of a glass-backed display screen. This allows the e-reading device 100 to be thinner.

The display unit 1506 includes a display screen 104. The display screen 104 can be, for example, a flexible E Ink display that is laminated with a touch panel, and which has a front light panel. The display screen 104 can also have an anti-glare cover lens.

Figure 16:
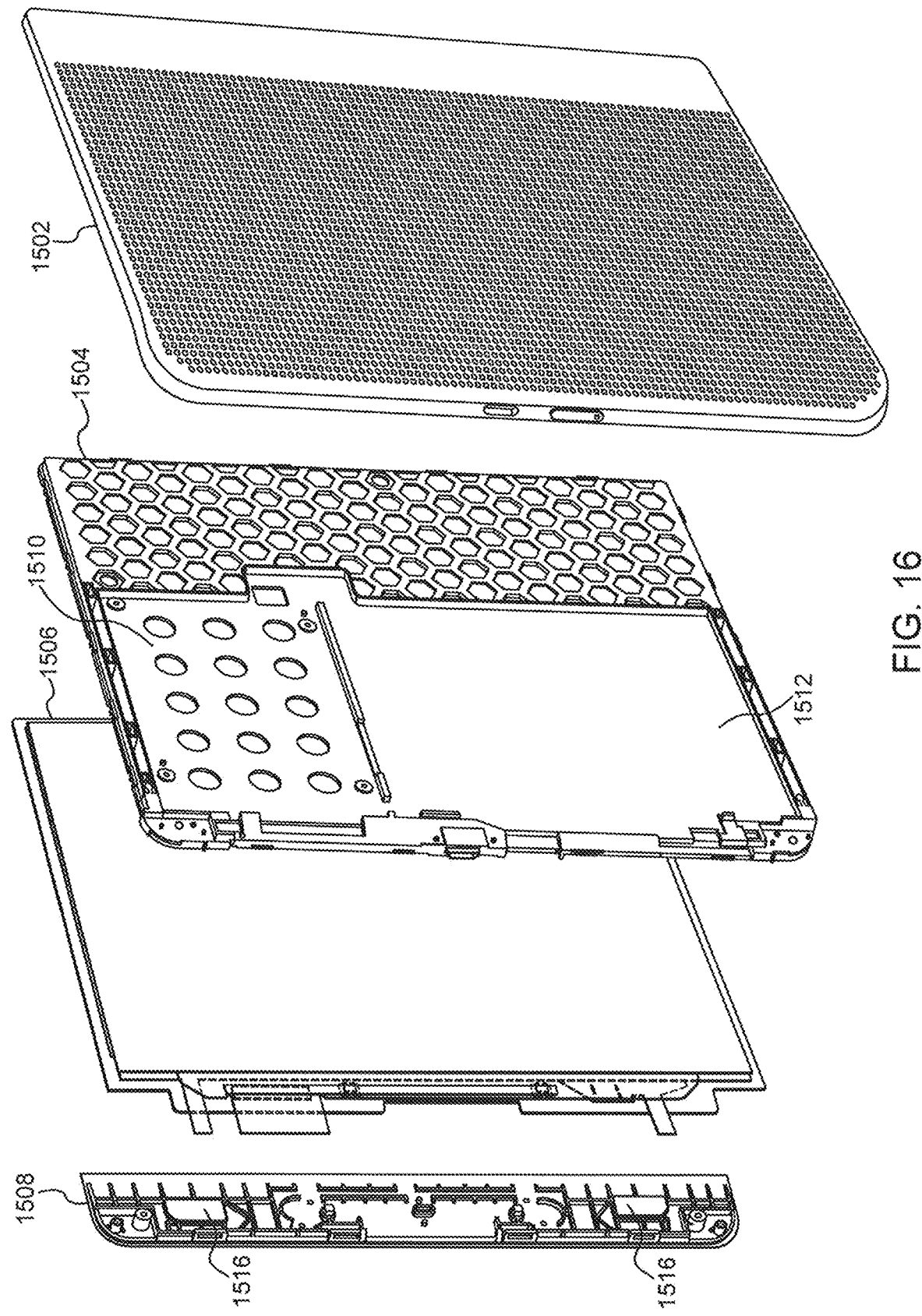
FIG. 16 is an exploded view of an electronic reading device according to one or more aspects of the disclosed subject matter.
Figure 19:
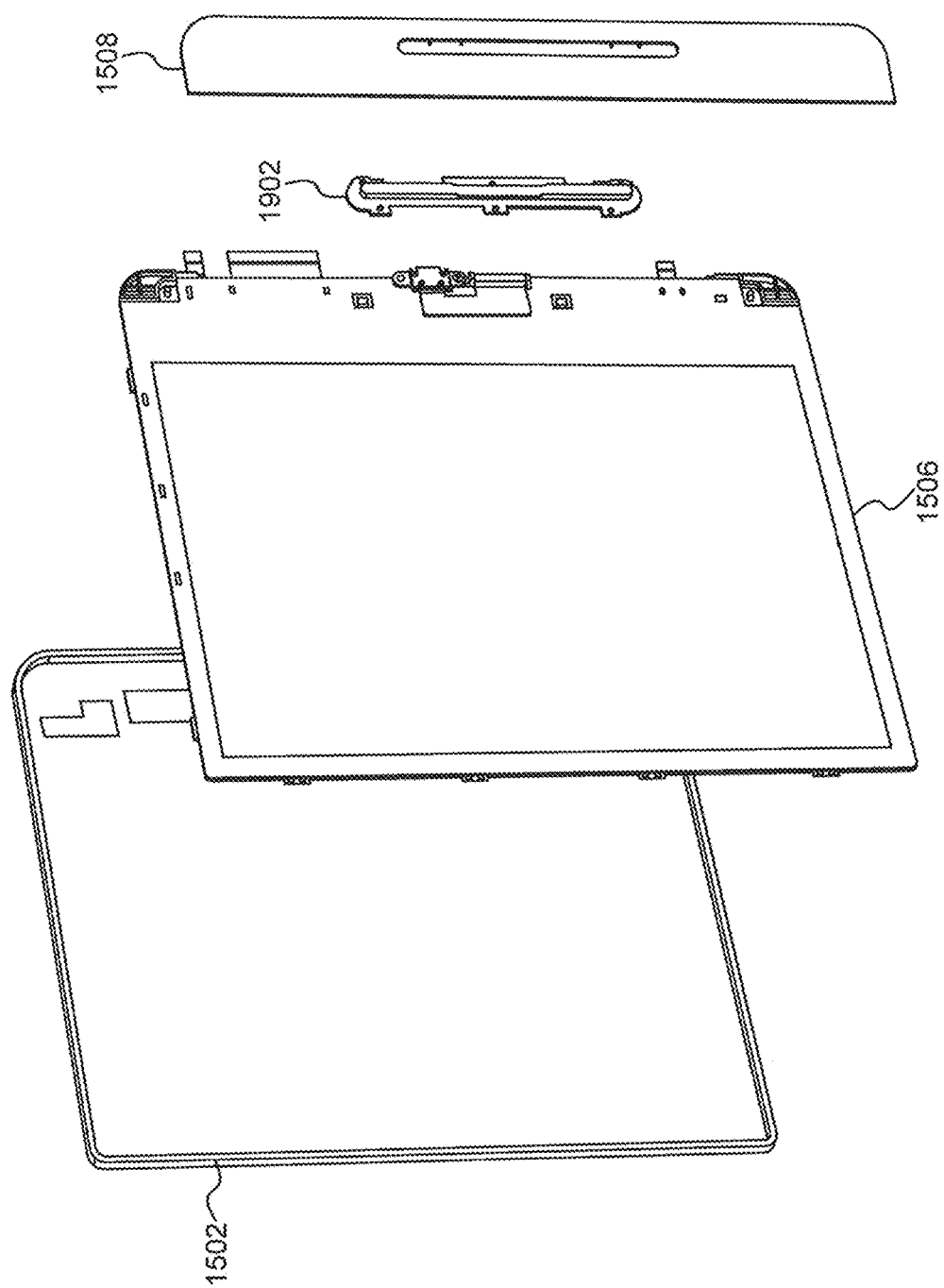
FIG. 19 is an exploded view of an electronic reading device according to one or more aspects of the disclosed subject matter.

The deco plate 1508 is a plate that, as seen in FIG. 19, is positioned on top of the display unit 1506. The deco plate 1508 is insert molded with a pre-printed soft touch In-Mold Transfer (IMR) film on top. As seen in FIGS. 15 and 16, the underside of the deco plate 1508 can include two or more magnets 1516. In an exemplary embodiment, the magnets 1516 are rectangular in shape. However, the magnets 1516 can be circular, square, or any other shape. The magnets 1516 in the deco plate 1508 can be used to interact with corresponding magnets in a front flap (i.e., cover) of a protective accessory case for the e-reader device 100. That is, a front flap of the case that is designed to protect the display screen 104 can have magnets located in positions where they would align with the magnets 1516 in the deco plate 1508 when the front flap is in the closed position and is in contact with the display screen 104. The magnets in the front flap of the case and the magnets 1516 in the deco plate 1508 keep the front flap closed while the e-reader device 100 is not in use.

FIG. 16 is an exploded view (mechanical stack up) of the e-reader device 100 in accordance with an exemplary embodiment, and is from a different perspective than FIG. 15.

Figure 17:
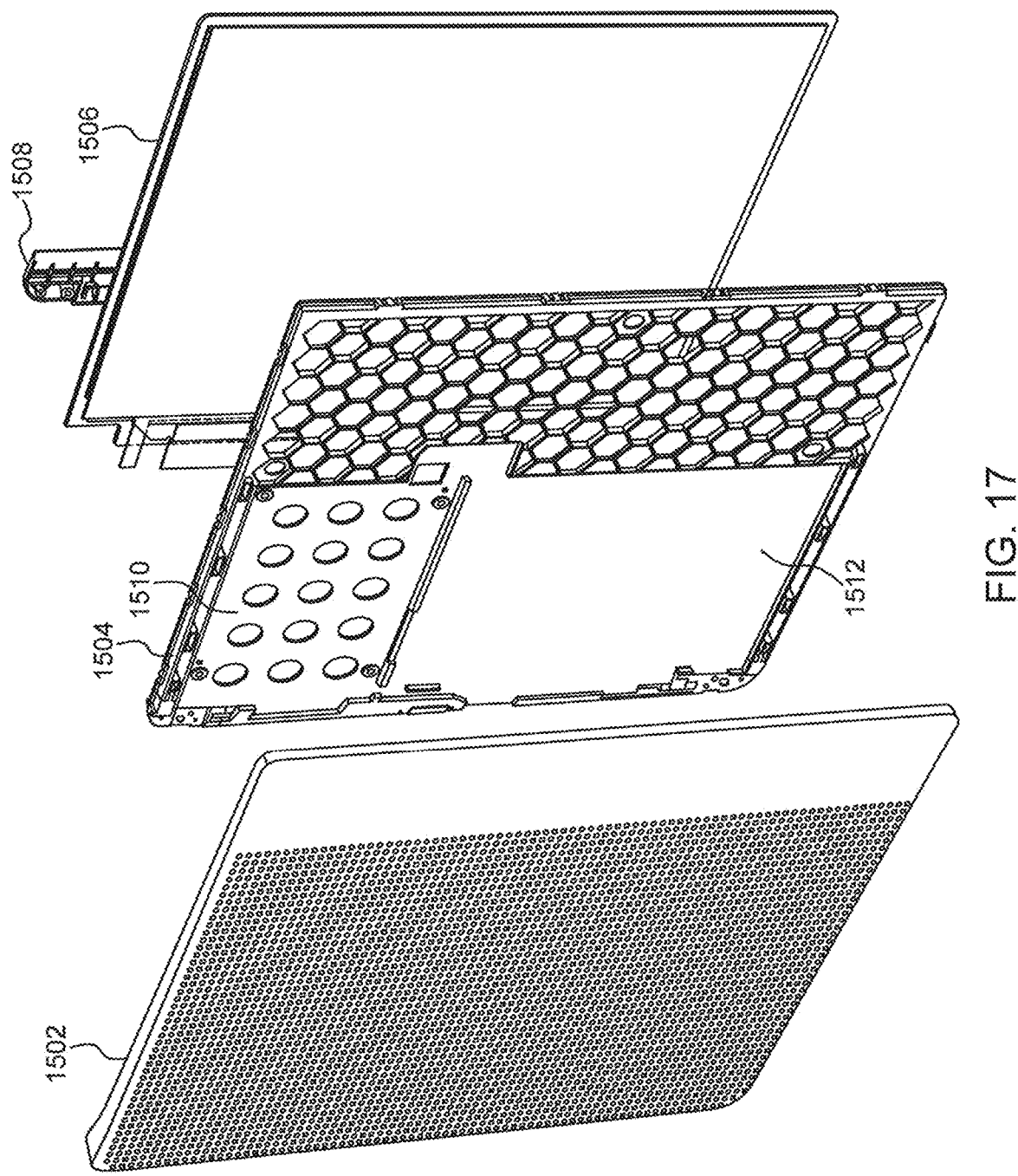
FIG. 17 is an exploded view of an electronic reading device according to one or more aspects of the disclosed subject matter.

FIG. 17 is an exploded view (mechanical stack up) of the e-reader device 100 in accordance with an exemplary embodiment, and is from a different perspective than FIG. 15.

Figure 18:
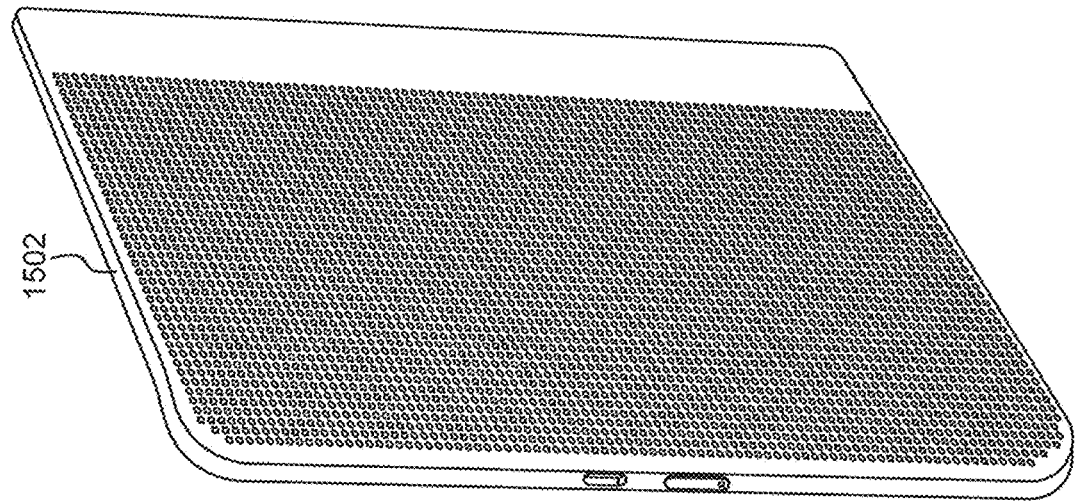
FIG. 18 is an exploded view of an electronic reading device according to one or more aspects of the disclosed subject matter.
Figure 18:
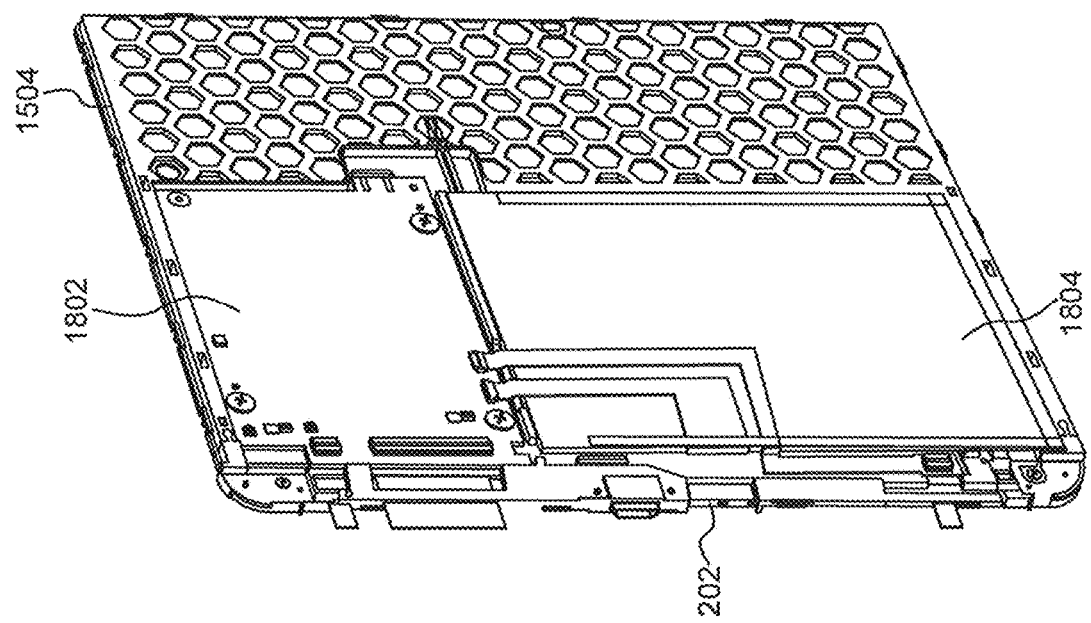
Figure 18:
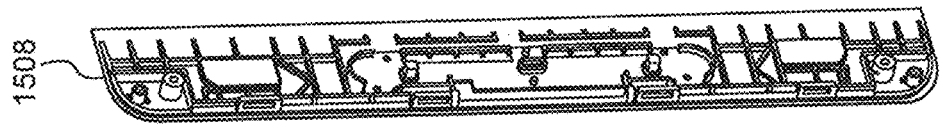

FIG. 18 is an exploded view (mechanical stack up) of the e-reader device 100 in accordance with an exemplary embodiment, and is from a different perspective than FIG. 15. Also, this view shows the mid-frame component 1504 outfitted with the battery 1804 and the PCB 1802. The display unit 1506 fits into a tray/recessed portion 2002 that is located on the side of the mid-frame component 1504 that cannot be seen in FIG. 18.

FIG. 19 is an exploded view (mechanical stack up) of the e-reader device 100 in accordance with an exemplary embodiment, and is from a different perspective than FIG. 15. FIG. 19 shows that the display unit 1506 snugly fits into the tray/recessed portion 2002 of the mid-frame component 1504. FIG. 19 also shows a button module 1902 that is a separate component than the deco plate 1508. The buttons of the button module 1902 fit inside a cutout portion of the deco plate 1508. In an exemplary embodiment, the button module 1902 has two buttons that are used to turn pages that are displayed on the e-reader device forward or backward. The button module 1902 can have extra buttons, in addition to the two page buttons, that perform other assigned functions.

Figure 20A:
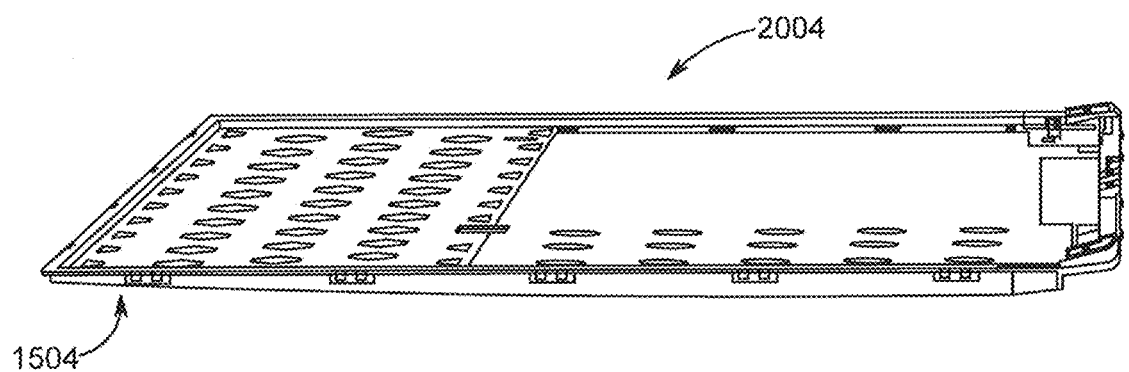
FIG. 20A is a perspective view of a mid-frame component of an electronic reading device according to one or more aspects of the disclosed subject matter.
Figure 20B:
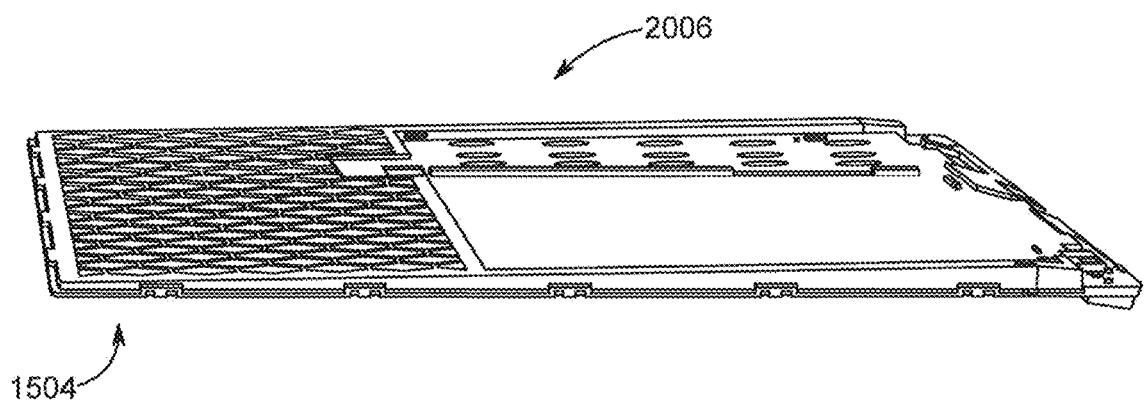
FIG. 20B is a perspective view of a mid-frame component of an electronic reading device according to one or more aspects of the disclosed subject matter.
Figure 20C:
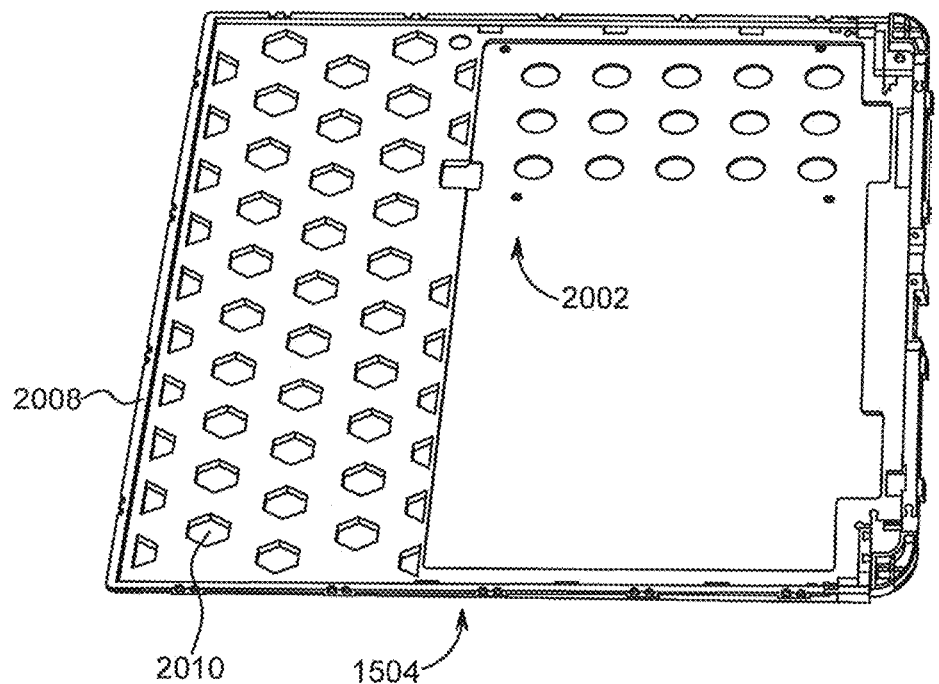
FIG. 20C is a perspective view of a mid-frame component of an electronic reading device according to one or more aspects of the disclosed subject matter.
Figure 20D:
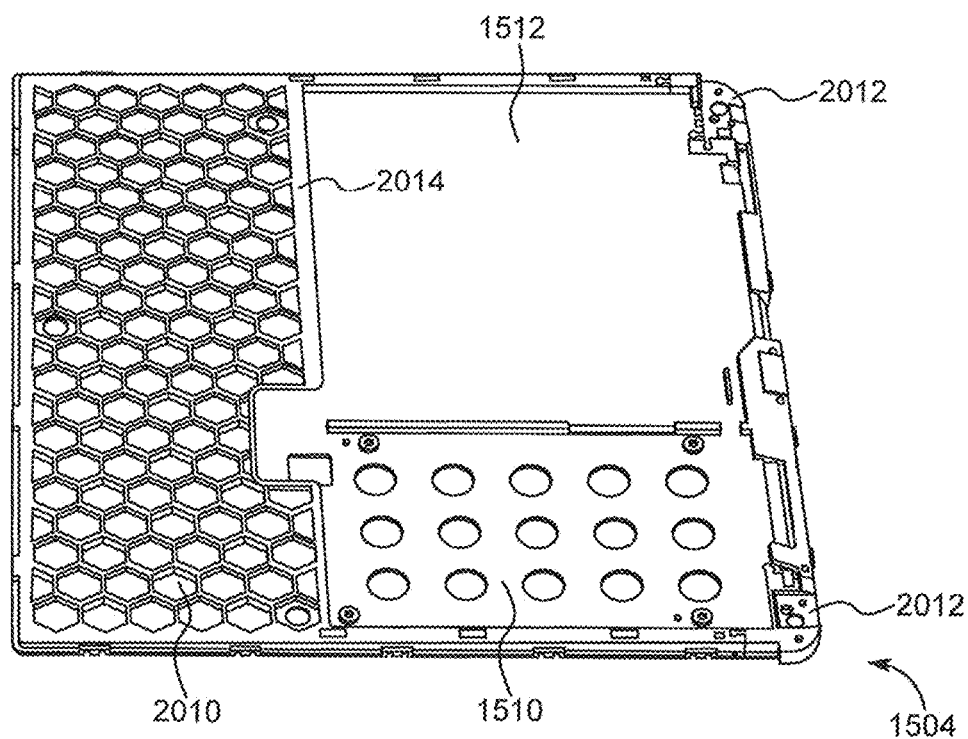
FIG. 20D is a perspective view of a mid-frame component of an electronic reading device according to one or more aspects of the disclosed subject matter.

FIGS. 20A, 20B, 20C, and 20D show different views/sides of the mid-frame component 1504. As seen in FIGS. 20A and 20C, the mid-frame component 1504 has a first side 2004 that accepts the display unit 1506. The display unit 1506 is held in place on the mid-frame component 1504 by raised edges 2008 that surround the perimeter of the first side 2004. As seen in FIGS. 20B and 20D, the mid-frame component 1504 has a second side 2006 that includes the first recessed portion 1512 (i.e., battery compartment) that accepts that battery 1804 and includes the second recessed portion 1510 that accepts the PCB 1802. The second side 2006 also includes one or more antenna compartments 2012. In an exemplary embodiment, there are two antenna compartments 2012. In an exemplary embodiment, the each of the two antenna compartments 2012 is locate at a corner of the mid-frame component 1504. A raised border wall 2014 forms a divider between the first recessed portion 1512 and the second recessed portion 1510, and the weight saving section with the perforations/holes 2010.

The operation of the first and second buttons 114, 116 will now be explained in greater detail. The first and second buttons 114, 116 can function as page turn buttons. If the e-reader device 100 is in the orientation shown in FIG. 9, with a user's right hand holding the e-reader device by the extended housing portion 118, one press of second button 116 will advance the book/text that is being displayed one page. One press of the first button 114 will move the book/text back one page to the previous page. If the second button 116 is held down, multiple pages will advance, and the longer the second button 116 is held, the faster the pages will advance. Similarly, if the first button 114 is held down, you can go back multiple pages, and the longer the first button 114 is held, the faster you can move to previous pages. When the first button 114 or the second button 116 is held down (fast-flip mode) data is captured so that the number of pages flipped through can be stored by the e-reader device 100. This information can be important to determine, for example, if a student skipped sections of a text book or other book.

In addition to paging up and down with the buttons 114, 116, these buttons can be used to control non-book scrolling. For example, if a web page is displayed with multiple pages, buttons 114, 116 can be used to scroll up and down the page, and a user does not need to use their finger on the screen. This allows a user to hold and control the device with one hand instead of two hands. Also, when the e-reader device 100 is displaying a library of books (i.e., an e-reader library or bookshelf), the buttons 114, 116 allow a user to page up and down through their library of books. The buttons 114, 116 can be also used to scroll through menus that displayed.

The buttons 114, 116 can also be used when viewing a PDF document/image on the display screen 104. When the display screen 104 is displaying less than the entire page of the PDF document/image, pressing the buttons 114, 116 causes the portion of the PDF that is currently being viewed to be changed rather than changing pages of the PDF document. In other words, the buttons 114, 116 allow you to flip between portions of a page of a PDF document, rather than flipping to different pages within the PDF document. In this mode, the buttons are used for moving up and down sub-portions of a page of a PDF. For example, if the upper half of a PDF page is displayed and the lower page of the PDF page is not displayed, by pressing the lower button among buttons 114, 116, the lower half of the PDF page will now be displayed instead of the next page being displayed.

The functions of the buttons 114, 116 are tied to the orientation of the e-reader device 100, which is detected by an accelerometer. For example, when the e-reader device 100 is in an orientation where the user's left hand is holding the e-reader device 100 by the extended housing portion 118, pressing the second button 116 will allow a move to a previous page/previous pages or scrolling upward depending on what is being displayed. Similarly, pressing the first button 114 will allow moving to a next page/next pages or scrolling downward depending on what is being displayed. Text/images on the display screen 104 can have four different orientations based on the orientation of the e-reader device 100, and whether the buttons 114, 116 function as page up/scroll up or page down/scroll down depends on the detected orientation of the e-reader device 100.

Figure 21A:
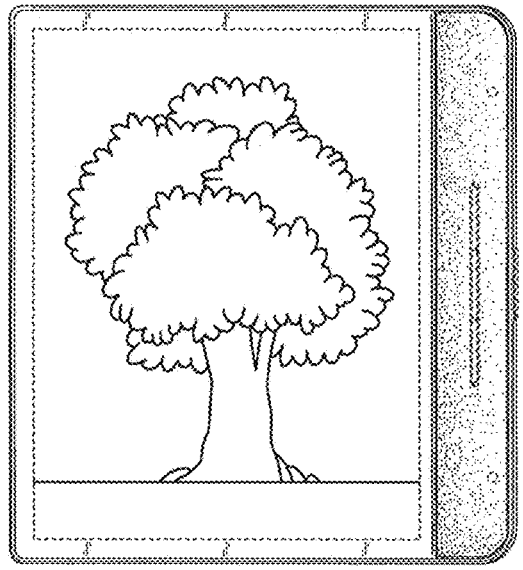
FIG. 21A is an image demonstrating a user-selectable screen rotation lock function in accordance with an exemplary embodiment.
Figure 21B:
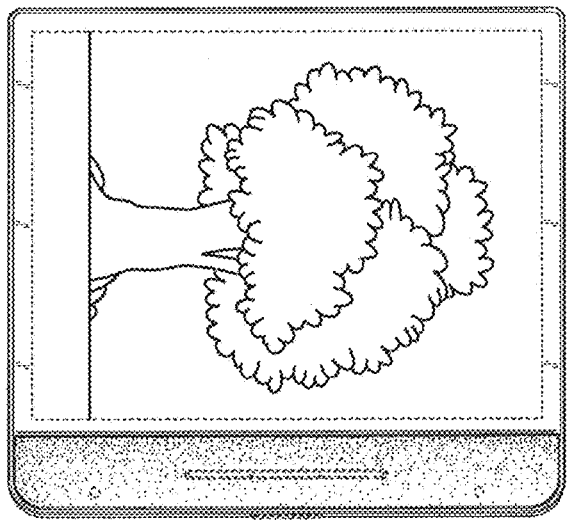
FIG. 21B is an image demonstrating a user-selectable screen rotation lock function in accordance with an exemplary embodiment.
Figure 21C:
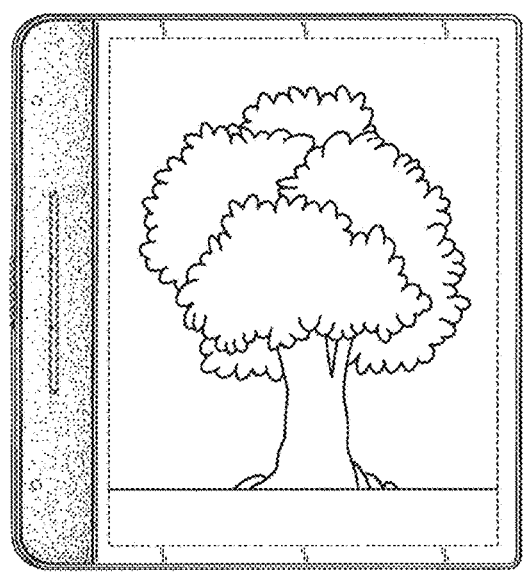
FIG. 21C is an image demonstrating a user-selectable screen rotation lock function in accordance with an exemplary embodiment.

In an exemplary embodiment, the e-reader device 100 has a user-selectable screen rotation lock function. For example, the user can access a menu for initiation of the user-selectable screen rotation lock function that is displayed on the display screen 104, and select an option that allows the screen to be locked in either the portrait orientation or the landscape orientation. In an exemplary embodiment, when the screen is locked to portrait mode, and the user switches the hand that is holding the device 100 (causing a 180 degree rotation of the device), the screen will be automatically rotated 180 degrees and remain in portrait mode. That is, the orientation of the images on the screen will be the same after the switching of hands as it was before. This is shown in FIGS. 21A and 21C. When the screen is locked in portrait mode and held with the user's right hand (FIG. 21A), the e-reader device 100 an be switched to a user's left hand (FIG. 21C), and the screen will still be in portrait mode and the screen that is displayed will still have the same orientation before the hand switch (180 degree rotation of the device). A landscape orientation will not be displayed while the device 100 is being rotated (see FIG. 21B). Similarly, when the screen is locked to landscape mode, and the user switches the hand that is holding the device 100 (causing a 180 degree rotation of the device), the screen will be automatically rotated 180 degrees and remain in landscape mode. A portrait orientation will not be displayed while the device 100 is being rotated.

Figure 22:
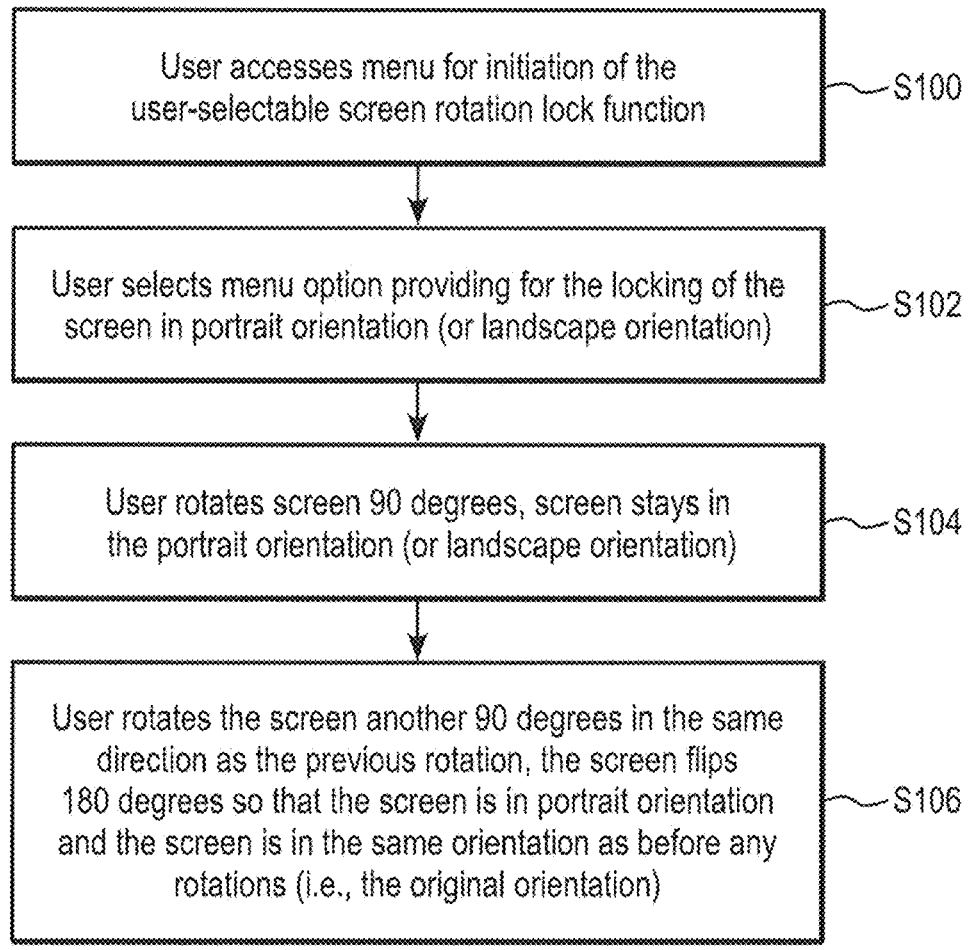
FIG. 22 is a flow chart depicting a user-selectable screen rotation lock function in accordance with an exemplary embodiment.

FIG. 22 is a flow chart that further describes the user-selectable screen rotation lock function. In step S100, the user accesses a menu for initiation of the user-selectable screen rotation lock function. Next, in step S102, the user selects the menu option providing for the locking of the screen in the portrait orientation (or the landscape orientation). In step S104, the user rotates the screen 90 degrees, and the screen stays in the portrait orientation (or landscape orientation). If, in step S106, the user rotates the screen another 90 degrees in the same direction as the previous rotation (e.g., device orientation in FIG. 21B to the device orientation in FIG. 21C), the screen flips 180 degrees so that the screen is in portrait orientation and the screen is in the same orientation as before any rotations (i.e., the original image orientation of FIG. 21A).

When the screen rotation lock function is not being used and the e-reader device 100 is in an automatic rotation mode, and a user moves the device 100 from a portrait orientation to a landscape orientation, instead of the screen 104 immediately switching orientations, a message is displayed that asks the user if they actually want the screen 104 to be rotated. For example, if a user is laying in bed on their side and reading in portrait mode, they will not want the screen 104 to switch to landscape mode. A similar message is displayed if the user moves the device 100 from a landscape orientation to a portrait orientation during the automatic rotation mode. Thus, with the user-selectable screen rotation lock function, a user can lock the screen to portrait mode (FIG. 21A), and then when they are reading on their side in bed, the screen will have the proper orientation shown in FIG. 21B. The screen will not automatically switch to landscape mode while the user is on their side with the screen locked to portrait mode.

The PCB 1802 (shown in FIG. 18) can include one more processor devices and one or more storage devices (e.g., ROM, RAM, hard drive, etc.) that can be used to implement the above described embodiments. Hardware, software, or any combination thereof can embody modules and components used to implement the methods described herein. If programmable logic is used, such logic can execute on a commercially available processing platform or a special purpose device. Processor devices can have one or more processor "cores." The terms "computer program medium," "non-transitory computer readable medium," and "computer usable medium" as discussed herein are used to generally refer to tangible media such as a removable storage unit and/or a hard disk installed in hard disk drive. Data stored in the PCB 1802 can be stored on any type of suitable computer readable media, such as magnetic tape storage (e.g., a hard disk drive). Computer programs can also be received by the PCB 1802 via a communications interface of the e-reader device 100. Such computer programs, when executed, can enable the PCB 1802 of the e-reader device 100 to implement the present methods as discussed herein.

An exemplary embodiment is directed to an electronic reading device 100, including: a housing, wherein exterior surfaces of the housing comprise a first main surface 102, a second main surface 302, a first edge 106, a second edge 108, a third edge 110, and a fourth edge 112, and each of the first edge 106, the second edge 108, the third edge 110, and the fourth edge 112 is located in between the first main surface 102 and the second main surface 302, and the third edge 110 is parallel to the fourth edge 112, and the first edge 106 is located at an opposite side of the housing than the second edge 108; and a display 104 that is surrounded by the housing. The first main surface 102 of the electronic reading device 100 includes the display 104, and the second main surface 302 of the electronic reading device 100 is an opposing surface to the first main surface 102. The housing is asymmetrical as it includes an extended housing portion 118 that is spaced away from one edge of the display 104 by a predetermined distance, a thickness of the housing between the first main surface 102 and the second main surface 302 increases from the second edge 108 to the first edge 106, and the housing has an upward bend at the extended housing portion 118 so that the first main surface 102 in the extended housing portion 118 is located above an exterior surface of the display 104. The upward bend allows the electronic reading device 100 to be easily picked up.

In an exemplary embodiment, the first main surface 102 is parallel to the second main surface 302 in the extended housing portion 118.

In an exemplary embodiment, the first main surface 102 is not parallel to the second main surface 302 outside of the extended housing portion 118.

In an exemplary embodiment, the extended housing portion 118 includes a first button 114 and a second button 116.

In an exemplary embodiment, the first button 114 and the second button 116 are raised so that they extend beyond the first main surface 102.

In an exemplary embodiment, the first button 114 and the second button 116 are separated from each other by a predetermined distance. In an exemplary embodiment, the predetermined distance is a distance that is within reach of a thumb when holding the electronic reading device 100 in portrait and landscape orientations.

In an exemplary embodiment, the first button 114 and the second button 116 each have a rectangular shape, with a longitudinal axis of the rectangular shape being parallel to the first edge 106.

In an exemplary embodiment, the electronic reading device 100 further includes: a mid-frame component 1504 that provides rigidity to the electronic reading device 100. The midframe component 1504 is configured to secure the display unit 1506, and the mid-frame component 1504 includes a first recessed portion 1512 configured to accept a battery 1804 and a second recessed portion 1510 that is configured to accept a printed circuit board 1802.

In an exemplary embodiment, the second recessed portion 1510 has a plurality of holes or perforated sections 2010 to reduce weight.

In an exemplary embodiment, the mid-frame component 1504 includes a weight reduction portion 1514 that has a ribbed or lattice type structure with a plurality of holes or sections to reduce weight.

In an exemplary embodiment, the lattice type structure is a honeycomb structure.

In an exemplary embodiment, the thickness of the mid-frame component 1504 tapers down and is smallest in the weight reduction portion 1514.

In an exemplary embodiment, the display 104 is a plastic-backed display screen.

In an exemplary embodiment, the mid-frame component 1504 is made of magnesium.

In an exemplary embodiment, the second main surface 302 is a back cover 1502 that is made of plastic.

In an exemplary embodiment, the plastic of the back cover 1502 has in-molded micro texture or has a soft touch coating applied to it for increased grip.

In an exemplary embodiment, the first main surface 102 in the extended housing portion 118 is soft touch coated and textured (e.g., rubber, etc.).

In an exemplary embodiment, a first rounded corner 120 connects the first edge 106 to the third edge 110, a second rounded corner 122 connects the first edge 106 to the fourth edge 112, a third rounded corner 124 connects the third edge 110 to the second edge 108, and a fourth rounded corner 126 connects the second edge 108 to the fourth edge 12.

In an exemplary embodiment, a radius of the first rounded corner 120 and the second rounded corner 122 is larger than a radius of the third rounded corner 124 and the fourth rounded corner 126 so as to offer maximum comfort to the palm when holding the extended housing portion 118 (the hand grip area) of the electronic reading device 100.

In an exemplary embodiment, the extended housing portion 118 has one or more magnets 1516 located within it that are configured to interact with corresponding magnets in a flap of a protective case to protect the display 104.

An exemplary embodiment is directed to an electronic reading device 100, including: a housing, wherein exterior surfaces of the housing comprise a first main surface 102, a second main surface 302, a first edge 106, a second edge 108, a third edge 110, and a fourth edge 112, and each of the first edge 106, the second edge 108, the third edge 110, and the fourth edge 112 is located in between the first main surface 102 and the second main surface 302, and a display 104, 1506 that is surrounded by the housing. The first main surface 102 of the electronic reading device 100 includes the display 104, and the second main surface 302 of the electronic reading device 100 is an opposing surface to the first main surface 102. The housing includes an extended housing portion 118 that is spaced away from one edge of the display 104 by a predetermined distance, and the extended housing portion 118 includes a first button 114 and a second button 116 that are configured to control the movement of text and/or images that are displayed on the display 104.

In an exemplary embodiment, the first button 114 and the second button 116 are raised so that they extend beyond the first main surface 102.

In an exemplary embodiment, the first button 114 and the second button 116 are separated from each other by a predetermined distance.

In an exemplary embodiment, the first button 114 and the second button 116 each have a rectangular shape, with a longitudinal axis of the rectangular shape being parallel to the first edge 106.

In an exemplary embodiment, the first button 114 and second button 116 have the same shape, a spacer 128 is located in between the first button 114 and the second button 116, and the spacer 128 is in contact with the first button 114 and the second button 116.

In an exemplary embodiment, the spacer 128 has the same shape and size as the first button 114 and the second button 116, but an exterior surface of the spacer 128 is flush with an exterior surface of the first main surface 102.

In an exemplary embodiment, the first button 114 is configured to advance a document or image that is displayed one page when pressed once by a user and the second button 116 is configured to move the document or image that is displayed back one page when pressed once by a user or the first button 114 is configured to move the document or image that is displayed back one page when pressed once by a user and the second button 116 is configured to advance the document or image that is displayed one page when pressed once by a user based on a detected physical orientation of the electronic reading device 100.

In an exemplary embodiment, the first button 114 or the second button 116 is configured to advance or reverse multiple pages when the first button 114 or the second button 116 is held down, and longer the first button 114 or the second button 116 is held down, the faster the pages will move.

In an exemplary embodiment, the electronic reading device 100 includes a memory device configured to store a number of pages that are advanced or reversed when the first button 114 or the second button 116 is held down.

In an exemplary embodiment, the first button 114 and the second button 116 are configured to control scrolling up and down within a menu that displays information regarding a plurality of e-books.

In an exemplary embodiment, the first button 114 and the second button 116 are configured to control paging up and down within a displayed web page or menu.

In an exemplary embodiment, when a Portable Document Format (PDF) file is displayed on the display 104, and the display 104 is displaying less than the entire page of the PDF file, the first button 114 and a second button 116 are configured to control which portion of the page of the PDF file is viewed when pressed.

An exemplary embodiment is directed to a method for controlling an electronic reading device 100 that includes a housing that contains a processor device, a memory device, a display 104, and an accelerometer, wherein a first button 114 and a second button 116 are located on an exterior surface of the housing. The method including: detecting, by the accelerometer, an orientation of the electronic reading device 100; pressing, by a user, the first button 114; and controlling, by the processor device, movement of text and/or images that are displayed on the display 104 based on the pressing of the first button 104 and the detected orientation of the electronic reading device.

In an exemplary embodiment, when the first button 114 is pressed once, the method includes controlling a document or image that is displayed on the display 104 to advance one page or to move back one page.

In an exemplary embodiment, the method includes pressing, by the user, the second button 116 once; and controlling a document or image that is displayed on the display 104 to advance one page or to move back one page.

In an exemplary embodiment, when the pressing of the first button 114 includes holding the first button 114 down, the method includes controlling a document or image that is displayed to advance or reverse multiple pages based on the holding of the first button 114, wherein longer the first button 114 is held down, the faster the pages will move.

In an exemplary embodiment, the method includes storing, in the memory device, a number of pages that are advanced or reversed when the first button 114 is held down.

In an exemplary embodiment, the method includes displaying, on the display 104, a menu that displays information regarding a plurality of e-books; and pressing of the first button 114 controls scrolling up or down within the menu that displays the information regarding the plurality of e-books.

In an exemplary embodiment, the pressing of the first button 114 controls paging up or down within a displayed web page or menu.

In an exemplary embodiment, the method includes displaying, on the display 104, a Portable Document Format (PDF) file, wherein when the display 104 is displaying less than the entire page of the PDF file, the pressing of the first button 114 controls which portion of the page of the PDF file is viewed.

An exemplary embodiment is directed to a method for controlling screen rotation of an electronic reading device 100 that includes processing circuitry, an accelerometer, and a display screen 104. The method including: receiving, by the processing circuitry, a request to access a menu for initiation of a screen-rotation lock function for the electronic reading device 100; displaying, on the display screen 104, the menu for the initiation of the screen-rotation lock function; receiving, by the processing circuitry, a selection of one particular screen orientation for the display screen 104 from among a plurality of screen orientations; rotating the electronic reading device 100 90 degrees; detecting, by the accelerometer, the 90 degree rotation; and maintaining a screen that is displayed on the display screen 104 in the selected one particular screen orientation.

In an exemplary embodiment, the method includes rotating the electronic reading device 100 another 90 degrees in the same direction as the previous rotation; detecting, by the accelerometer, the rotation of the other 90 degrees; and controlling, by the processing circuitry, the screen that is displayed on the display screen to flip 180 degrees so that the screen is in the same orientation as before the rotations.

In an exemplary embodiment, the plurality of screen orientations are a portrait orientation and a landscape orientation.

In an exemplary embodiment, the selection of one particular screen orientation is a selection of the portrait orientation or the landscape orientation.

In an exemplary embodiment, during the 90 degree rotation and the other 90 degree rotation, only the selected one particular screen orientation is displayed.

In an exemplary embodiment, the method includes: rotating, when the electronic reading device 100 is in an automatic rotation mode, the electronic reading device 100 90 degrees; detecting, by the accelerometer, the 90 degree rotation; and displaying, on the display screen 104, a message that asks a user if rotation of the displayed screen is to be performed.

An exemplary embodiment is directed to a non-transitory computer-readable storage medium storing computer-readable instructions thereon which when executed by processing circuitry of an electronic reading device 100, cause the processing circuitry to perform a method for controlling screen rotation. The method including: receiving a request to access a menu for initiation of a screen-rotation lock function for the electronic reading device 100; displaying, on a display screen 104, the menu for the initiation of the screen-rotation lock function; receiving a selection of one particular screen orientation for the display screen 104 from among a plurality of screen orientations; detecting a 90 degree rotation of the electronic reading device 100; and maintaining a screen that is displayed on the display screen 104 of the electronic reading device 100 in the selected one particular screen orientation.

In an exemplary embodiment, the method includes detecting rotation of the electronic reading device 100 another 90 degrees in the same direction as the previous rotation; and controlling the screen that is displayed on the display screen to flip 180 degrees so that the screen is in the same orientation as before the rotations.

In an exemplary embodiment, the plurality of screen orientations are a portrait orientation and a landscape orientation.

In an exemplary embodiment, the selection of one particular screen orientation is a selection of the portrait orientation or the landscape orientation.

In an exemplary embodiment, during the 90 degree rotation and the other 90 rotation orientation, only the selected one particular screen orientation is displayed.

In an exemplary embodiment, the method includes detecting, when the electronic reading device 100 is in an automatic rotation mode, a 90 degree rotation of the electronic reading device 100; and displaying, on the display screen 104, a message that asks a user if rotation of the displayed screen is to be performed.

An exemplary embodiment is directed to an electronic reading device 100 that includes an accelerometer, a display screen 104, and processing circuitry. The processing circuitry is configured to: receive a request to access a menu for initiation of a screen-rotation lock function for the electronic reading device 100, display on the display screen 104 the menu for the initiation of the screen-rotation lock function, receive a selection of one particular screen orientation for the display screen 104 from among a plurality of screen orientations, receive information indicating that the electronic reading device 100 has been detected by the accelerometer to have been rotated 90 degrees, and maintain a screen that is displayed on the display screen 104 in the selected one particular screen orientation.

In an exemplary embodiment, the processing circuitry is configured to: detect rotation of the electronic reading device 100 another 90 degrees in the same direction as the previous rotation; and control the screen that is displayed on the display screen to flip 180 degrees so that the screen is in the same orientation as before the rotations.

In an exemplary embodiment, the plurality of screen orientations are a portrait orientation and a landscape orientation.

In an exemplary embodiment, the selection of one particular screen orientation is a selection of the portrait orientation or the landscape orientation.

In an exemplary embodiment, during the 90 degree rotation and the other 90 degree rotation, only the selected one particular screen orientation is displayed.

In an exemplary embodiment, the processing circuitry is configured to: when the electronic reading device 100 is in an automatic rotation mode, receive information that indicates that the electronic reading device 100 has been detected to have been rotated 90 degrees; and display, on the display screen 104, a message that asks a user if rotation of the displayed screen is to be performed.

An exemplary embodiment is directed to a non-transitory computer-readable storage medium storing computer-readable instructions thereon which when executed by processing circuitry of an electronic reading device 100, cause the processing circuitry to perform a method for controlling screen rotation. The method including: detecting, when the electronic reading device 100 is in an automatic rotation mode, a 90 degree rotation of the electronic reading device 100; and displaying, on the display screen 104, a message that asks a user if rotation of the displayed screen is to be performed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An electronic reading device, comprising:
   a housing, wherein exterior surfaces of the housing comprise a first main surface, a second main surface, a first edge, a second edge, a third edge, and a fourth edge, and each of the first edge, the second edge, the third edge, and the fourth edge is located in between the first main surface and the second main surface, and the third edge is parallel to the fourth edge, and the first edge is located at an opposite side of the housing than the second edge;
   a display that is surrounded by the housing, wherein the first main surface of the electronic reading device includes the display, and the second main surface of the electronic reading device is an opposing surface to the first main surface,
   wherein the housing is asymmetrical as it includes an extended housing portion that is spaced away from one edge of the display by a predetermined distance, a thickness of the housing between the first main surface and the second main surface increases from the second edge to the first edge, and the housing has an upward bend at the extended housing portion so that the first main surface in the extended housing portion is located above an exterior surface of the display; and a mid-frame component that provides rigidity to the electronic reading device, wherein the midframe component is configured to secure the display, and the mid-frame component includes a first recessed portion configured to accept a battery and a second recessed portion that is configured to accept a printed circuit board;

wherein the second recessed portion has a plurality of holes or perforated sections to reduce weight, and wherein the mid-frame component includes a weight reduction portion that has a ribbed or lattice type structure with a plurality of holes or sections to reduce weight.

2. The electronic reading device of claim 1, wherein the first main surface is parallel to the second main surface in the extended housing portion.

3. The electronic reading device of claim 2, wherein the first main surface is not parallel to the second main surface outside of the extended housing portion.

4. The electronic reading device of claim 1, wherein the extended housing portion includes a first button and a second button.

5. The electronic reading device of claim 4, wherein the first button and the second button are raised so that they extend beyond the first main surface.

6. The electronic reading device of claim 5, wherein the first button and the second button are separated from each other by a predetermined distance.

7. The electronic reading device of claim 6, wherein the first button and the second button each have a rectangular shape, with a longitudinal axis of the rectangular shape being parallel to the first edge.

8. The electronic reading device of claim 1, wherein the lattice type structure is a honeycomb structure.

9. The electronic reading device of claim 1, wherein the thickness of the mid-frame component tapers down and is smallest in the weight reduction portion.

10. The electronic reading device of claim 1, wherein the display is a plastic-backed display screen.

11. The electronic reading device of claim 1, wherein the mid-frame component is made of magnesium.

12. The electronic reading device of claim 1, wherein the second main surface is a back cover that is made of plastic.

13. The electronic reading device of claim 12, wherein the plastic of the back cover has in-molded micro texture or has a soft touch coating applied to it for increased grip.

14. The electronic reading device of claim 1, wherein the first main surface in the extended housing portion is soft touch coated and textured.

15. The electronic reading device of claim 1, wherein a first rounded corner connects the first edge to the third edge, a second rounded corner connects the first edge to the fourth edge, a third rounded corner connects the third edge to the second edge, and a fourth rounded corner connects the second edge to the fourth edge.

16. The electronic reading device of claim 15, wherein a radius of the first rounded corner and the second rounded corner is larger than a radius of the third rounded corner and the fourth rounded corner.

17. The electronic reading device of claim 1, wherein the extended housing portion has one or more magnets located within it that are configured to interact with corresponding magnets in a flap of a protective case to protect the display.

* * * * *